(12) United States Patent
Southwell et al.

(10) Patent No.: US 10,934,478 B2
(45) Date of Patent: Mar. 2, 2021

(54) ENHANCED OIL RECOVERY USING TREATMENT FLUIDS COMPRISING COLLOIDAL SILICA WITH A PROPPANT

(71) Applicant: Nissan Chemical America Corporation, Houston, TX (US)

(72) Inventors: John Edmond Southwell, Glen Ellyn, IL (US); Yusra Khan Ahmad, Friendswood, TX (US); David Holcomb, Florence, AZ (US)

(73) Assignee: Nissan Chemical America Corporation, Houston, TX (US)

( * ) Notice: Subject to any disclaimer, the term of this patent is extended or adjusted under 35 U.S.C. 154(b) by 0 days.

(21) Appl. No.: 16/672,212

(22) Filed: Nov. 1, 2019

(65) Prior Publication Data

US 2020/0140748 A1 May 7, 2020

Related U.S. Application Data

(60) Provisional application No. 62/755,357, filed on Nov. 2, 2018.

(51) Int. Cl.
- *C09K 8/80* (2006.01)
- *C09K 8/58* (2006.01)
- *E21B 43/267* (2006.01)

(52) U.S. Cl.
CPC ............... *C09K 8/805* (2013.01); *C09K 8/58* (2013.01); *E21B 43/267* (2013.01); *C09K 2208/10* (2013.01)

(58) Field of Classification Search
CPC .... C09K 2208/10; C09K 8/467; C09K 8/588; C09K 8/80; C09K 8/70; C09K 8/035; C09K 8/032; C09K 8/665; E21B 33/14; E21B 47/1015; E21B 49/00; E21B 43/267

See application file for complete search history.

(56) References Cited

U.S. PATENT DOCUMENTS

| | | | |
|---|---|---|---|
| 3,506,070 A | 4/1970 | Jones | |
| 3,613,786 A | 10/1971 | Jones et al. | |
| 3,623,553 A | 11/1971 | Burdge | |
| 3,740,343 A | 6/1973 | Jones | |
| 3,885,628 A | 5/1975 | Reed et al. | |
| 3,981,361 A | 9/1976 | Healy | |
| 4,240,504 A | 12/1980 | Reed | |
| 4,328,106 A | 5/1982 | Harrar et al. | |
| 4,348,462 A | 9/1982 | Chung | |
| 4,390,068 A | 6/1983 | Patton et al. | |
| 4,892,146 A | 1/1990 | Shen | |
| 5,168,082 A | 12/1992 | Matchett et al. | |
| 5,381,863 A | 1/1995 | Wehner | |
| 6,863,985 B2 | 3/2005 | Stark et al. | |
| 7,033,975 B2 | 4/2006 | Baran, Jr. et al. | |
| 7,101,616 B2 | 9/2006 | Arney et al. | |
| 7,216,712 B2 | 5/2007 | Dalton | |
| 7,380,606 B2 | 6/2008 | Pursley et al. | |
| 7,482,310 B1 | 1/2009 | Reese et al. | |
| 7,544,726 B2 | 6/2009 | Greenwood | |
| 7,553,888 B2 | 6/2009 | Greenwood et al. | |
| 8,101,812 B2 | 1/2012 | Fan et al. | |
| 8,272,442 B2 | 9/2012 | Fan et al. | |
| 8,404,107 B2 | 3/2013 | Fan et al. | |
| 8,522,876 B2 | 9/2013 | Fan et al. | |
| 8,685,234 B2 | 4/2014 | Fan et al. | |
| 9,068,108 B2 | 6/2015 | Hill et al. | |
| 9,181,468 B2 | 11/2015 | Fan et al. | |
| 9,321,955 B2 | 4/2016 | Hill et al. | |
| 9,428,683 B2 | 8/2016 | Hill et al. | |
| 9,464,223 B2 | 10/2016 | Champagne et al. | |
| 9,505,970 B2 | 11/2016 | Vaughn et al. | |
| 9,512,352 B2 | 12/2016 | Roddy et al. | |
| 9,708,525 B2 | 7/2017 | Suresh et al. | |
| 9,725,999 B2 | 8/2017 | Castrogiovanni et al. | |
| 9,790,414 B2 | 10/2017 | Champagne et al. | |
| 9,850,418 B2 | 12/2017 | Champagne et al. | |
| 9,868,893 B2 | 1/2018 | Saboowala et al. | |
| 9,884,988 B2 | 2/2018 | Dismuke et al. | |
| 10,113,406 B1 | 10/2018 | Gomaa et al. | |
| 10,160,682 B2 | 12/2018 | Mehta et al. | |
| 10,377,942 B2 | 8/2019 | Southwell et al. | |
| 10,557,078 B2 | 2/2020 | Southwell | |
| 10,563,117 B2 | 2/2020 | Southwell et al. | |
| 10,570,331 B2 | 2/2020 | Southwell et al. | |
| 10,570,715 B2 | 2/2020 | Babcock et al. | |
| 2003/0220204 A1 | 11/2003 | Baran et al. | |

(Continued)

FOREIGN PATENT DOCUMENTS

CN 101735787 A 6/2010
CN 102838981 A 12/2012

(Continued)

OTHER PUBLICATIONS

Office Action dated Jun. 5, 2018, in U.S. Appl. No. 15/946,338 (16 pages).
International Search Report dated Aug. 1, 2018, in International Patent Application No. PCT/US2018/026227 (15 pages).
Estephan et al., "Zwitterion-Stabilized Silica Nanoparticles: Toward Nonstick Nano", Langmuir, vol. 26, No. 22, Nov. 16, 2010; 16884-16889 (6 pages).
Bjorkegren, et al., "Hydrophilic and hydrophobic modifications of colloidal silica particles for Pickering emulsions", Journal of Colloid and Interface Science, Academic Press, Inc, US, vol. 487, 2017; 250-257.
Bjorkegren, "Functionalization and characterization of aqueous silica sols and their application in Pickering emulsions", Jan. 1, 2016, XP055492689, Retrieved from the Internet, www://publications.lib.chalmers.se/records/fulltext/246587/246587.pdf. pp. 1-34 and 7 page index (41 pages).

(Continued)

Primary Examiner — Zakiya W Bates
(74) Attorney, Agent, or Firm — Nixon & Vanderhye, PC

(57) ABSTRACT

Provided herein are methods of increasing production from a hydrocarbon containing formation by adding a proppant to the formation, wherein a treatment fluid comprising a colloidal silica nanoparticle is added to the formation before, during or after the time the proppant is added to the formation.

14 Claims, 1 Drawing Sheet

(56) References Cited

U.S. PATENT DOCUMENTS

| | | | |
|---|---|---|---|
| 2004/0077768 | A1 | 4/2004 | Greenwood |
| 2004/0097600 | A1 | 5/2004 | Greenwood et al. |
| 2006/0260815 | A1 | 11/2006 | Dahanayake et al. |
| 2007/0238088 | A1 | 10/2007 | Rubinsztajn et al. |
| 2008/0289828 | A1 | 11/2008 | Hutchins et al. |
| 2010/0096139 | A1 | 4/2010 | Holcomb et al. |
| 2010/0147515 | A1 | 6/2010 | Hughes et al. |
| 2011/0220360 | A1 | 9/2011 | Lindvig et al. |
| 2012/0024530 | A1 | 2/2012 | Todd et al. |
| 2012/0168165 | A1 | 7/2012 | Holcomb et al. |
| 2012/0175120 | A1 | 7/2012 | Holcomb et al. |
| 2013/0341020 | A1 | 12/2013 | Nguyen et al. |
| 2014/0008067 | A1 | 1/2014 | Roddy et al. |
| 2014/0116695 | A1 | 5/2014 | Maghrabi et al. |
| 2014/0162911 | A1 | 6/2014 | Monastiriotis et al. |
| 2014/0284053 | A1 | 9/2014 | Germack |
| 2014/0332218 | A1 | 11/2014 | Castrogiovanni et al. |
| 2014/0338906 | A1 | 11/2014 | Monastiriotis et al. |
| 2014/0338911 | A1 | 11/2014 | Dismuke et al. |
| 2014/0374095 | A1 | 12/2014 | Ladva et al. |
| 2015/0068744 | A1 | 3/2015 | Welton et al. |
| 2015/0068755 | A1 | 3/2015 | Hill et al. |
| 2015/0218435 | A1 | 8/2015 | Suresh et al. |
| 2015/0268370 | A1 | 9/2015 | Johnston et al. |
| 2015/0292308 | A1 | 10/2015 | Conway |
| 2016/0017204 | A1 | 1/2016 | Hill et al. |
| 2016/0137907 | A1 | 5/2016 | Vo et al. |
| 2016/0168443 | A1* | 6/2016 | Lafitte .............. C04B 20/1018 507/112 |
| 2016/0194550 | A1 | 7/2016 | Hill et al. |
| 2016/0362594 | A1 | 12/2016 | Rojas et al. |
| 2016/0369158 | A1 | 12/2016 | Patino |
| 2017/0114613 | A1 | 4/2017 | Lecerf et al. |
| 2017/0306219 | A1 | 10/2017 | Quintero et al. |
| 2018/0291255 | A1 | 10/2018 | Southwell |
| 2018/0291261 | A1 | 10/2018 | Southwell et al. |
| 2019/0048251 | A1 | 2/2019 | Agrawal et al. |
| 2019/0078015 | A1 | 3/2019 | Southwell et al. |
| 2019/0078016 | A1 | 3/2019 | Southwell et al. |
| 2019/0093462 | A1 | 3/2019 | Watts et al. |
| 2019/0136123 | A1* | 5/2019 | Holcomb .............. C09K 8/601 |
| 2019/0225871 | A1 | 7/2019 | Southwell et al. |
| 2019/0345375 | A1 | 11/2019 | Nguyen et al. |
| 2019/0382645 | A1 | 12/2019 | Southwell et al. |
| 2020/0123435 | A1 | 4/2020 | Southwell |

FOREIGN PATENT DOCUMENTS

| | | |
|---|---|---|
| CN | 106085401 A | 11/2016 |
| EP | 1509676 | 3/2005 |
| EP | 1818693 A1 | 8/2007 |
| EP | 2465911 A1 | 6/2012 |
| JP | H01-035157 | 7/1989 |
| JP | H01234468 A | 9/1989 |
| JP | H03 31380 | 2/1991 |
| JP | H05-086989 | 12/1993 |
| JP | H10111544 A | 4/1998 |
| JP | 2004150859 A | 5/2004 |
| JP | 4033970 B2 | 1/2008 |
| JP | 5026264 B2 | 9/2012 |
| KR | 101872020 B1 | 6/2018 |
| WO | WO 1995/011280 A1 | 4/1995 |
| WO | WO 2003/100214 A1 | 12/2003 |
| WO | WO 2005018300 A2 | 3/2005 |
| WO | WO 2009044912 A1 | 4/2009 |
| WO | WO 2010/103020 A1 | 9/2010 |
| WO | WO 2013192634 A2 | 12/2013 |
| WO | WO 2014/153102 A1 | 9/2014 |
| WO | WO 2014176188 A1 | 10/2014 |
| WO | WO 2014/201367 A1 | 12/2014 |
| WO | WO 2014204709 A2 | 12/2014 |
| WO | WO 2016/040742 A1 | 3/2016 |
| WO | WO 2016/205289 A1 | 12/2016 |
| WO | WO 2017011328 A1 | 1/2017 |
| WO | WO 2017/023665 A1 | 2/2017 |
| WO | WO 2017062086 A1 | 4/2017 |
| WO | WO 2018004560 A1 | 1/2018 |
| WO | WO 2018089019 A1 | 5/2018 |
| WO | WO 2018157099 A1 | 8/2018 |
| WO | WO 2018187550 A1 | 10/2018 |
| WO | WO 2018187563 A1 | 10/2018 |
| WO | WO 2019054414 A1 | 3/2019 |
| WO | WO 2020092920 A1 | 5/2020 |

OTHER PUBLICATIONS

Bjorkegren, et a., "Surface activity and flocculation behavior of polyethylene glycol-functionalized silica nanoparticles", Journal of Colloid and Interface Science, Academic Press,Inc, US, vol. 452, Apr. 27, 2015, 215-223 (9 pages).

De Lara et al., "Functionalized Silica Nanoparticles within Multicomponent Oil/Brine Interfaces: a Study in Molecular Dynamics", Journal of Physical Chemistry C, vol. 120, No. 12, Mar. 22, 2016, 6787-6795 (9 pages).

International Search Report dated Aug. 1, 2018, in International Patent Application No. PCT/US2018/026245 (14 pages).

Brunel, "Functionalized micelle-templated silicas (MTS) and their use as catalysts for fine chemicals", Microporous and Mesoporous Materials, vol. 27, No. 2-3, Feb. 1, 1999, 329-344 (16 pages).

Non-Final Office Action dated Sep. 10, 2018, in U.S. Appl. No. 15/946,252 (10 pages).

Farooqui et al., "Improvement of the Recovery Factor Using Nano-Metal Particles at the Late Stages of Cyclic Steam Stimulation", Society of Petroleum Engineers, XP-002776733, SPE-174478-MS, Jun. 11, 2015.

Ju et al., "Enhanced Oil Recovery by Flooding with Hydrophilic NanoParticles", China Particuology vol. 4, No. 1, 41-46, 2006.

Goodwin et al., "Functionalization of Colloidal Silica and Silica Surfaces via Silylation Reactions", Colloid Polym Sci 268:766-777 (1990).

Zhang, et al., "Foams and Emulsions Stabilized with Nanoparticles for Potential Conformance Control Applications", SPE International Symposium on Oilfield Chemistry held in the Woodlands, Texas, USA, Apr. 20-22, 2009.

McElfresh et al., "Application of Nanofluid Technology to Improve Recovery in Oil and Gas Wells", SPE International Oilfield Nanotechnology Conference held in Noordwijk, The Netherlands, Jun. 12-14, 2012.

Hoelscher et al., "Application of NanoTechnology in Drilling Fluids", SPE International Oilfield Nanotechnology Conference held in Noordwijk, The Netherlands, Jun. 12-14, 2012.

Hendraningrat et al., "A Corefield Investigation of Nanofluid Enhanced Oil Recovery in Low-Medium Permeability Berea Sandstone", SPE International Symposium on Oilfield Chemistry held in the Woodlands, Texas, USA, Apr. 8-10, 2013.

Arkles, "Hydrophobicity, Hydrophilicity and Silanes", Paint & Coatings Industry Magazine, Oct. 2006.

European Search Report dated Jul. 31, 2017 in European Patent Application No. 17166435.2 (8 pages).

European Search Report dated Jul. 31, 2017 in European Patent Application No. 17166443.6 (7 pages).

European Search Report dated Jul. 31, 2017 in European Patent Application No. 17166426.1 (7 pages).

Final Office Action dated Jun. 18, 2019 in U.S. Appl. No. 16/129,688, filed Sep. 12, 2018.

Final Office Action dated Jun. 18, 2019 in U.S. Appl. No. 16/129,705, filed Sep. 12, 2018.

Notice of Allowance dated Jun. 24, 2019 in U.S. Appl. No. 15/946,338, filed Apr. 5, 2018.

Technical Data Sheet of Aerosil R972 downloaded on Jun. 12, 2019.

A Search Report dated Oct. 12, 2018 in Great Britain Application No. GB1811749.9 (3 pages).

Alomair, O. A., et al., "Nanofluids Application for Heavy Oil Recovery" SPE International, SPE-171S39-MS, Society of Petroleum Engineers (Oct. 2014).

Amendment and Response to Office Action with Declaration Under 37 C.F.R. §1.132 filed Jan. 11, 2019 in U.S. Appl. No. 15/946,338.

(56) References Cited

OTHER PUBLICATIONS

Aminzadeh, B., et al., "Influence of Surface-Treated Nanoparticles on Displacement Patterns During CO Injection," SPE Annual Technical Conference and Exhibition, 20 pages (Jan. 2013).
Carpenter, "Modeling of Production Decline Caused by Fines Migration in Deepwater Reservoirs" Journal of Petroleum Technology, 75-77 (Feb. 2018).
Denney, "Nanosized Particles for Enhanced Oil Recovery" Journal of Petroleum Technology, 54-46 (Jan. 2011).
EPA, "Method 180.1: Determination of Turbidity by Nephelometry," (Aug. 1993).
Extended European Search Report dated Jan. 8, 2018, in EP Application No. 17194608.0 (6 pages).
International Search Report and Written Opinion for International Application No. PCT/JP2017/037208, European Patent Office, The Hague, dated Jun. 5, 2018, 8 pages.
International Search Report and Written Opinion for International Application No. PCT/US2018/052736, European Patent Office, The Hague, dated Dec. 12, 2018, 9 pages.
International Search Report and Written Opinion for International Application No. PCT/US2018/058954, European Patent Office, The Hague, dated Feb. 13, 2019, 12 pages.
Jurinak, J.J., et al., "Oilfield Applications of Colloidal Silica Gel," SPE Production Engineering, 6 (4):406-412 (Nov. 1991), XP055551121.
Li, L., et al., "Gas Selection for Huff-n-Puff EOR in Shale Oil Reservoirs Based upon Experimental and Numerical Study," Society of Petroleum Engineers, SPE-185066-MS, 15 pages (2017).
Li, L., et al., "Optimization of Huff-n-Puff Gas Injection to Enhance Oil Recovery in Shale Reservoirs," Society of Petroleum Engineers, SPE-180219-MS, 18 pages (2016).
Miller, B.J., et al., "Field Case: Cyclic Gas Recovery for Light Oil-Using Carbon Dioxide/Nitrogen/Natural Gas," Society of Petroleum Engineers, SPE 49169, 7 pages (1998).
Wilson, A., "Field Trials of Reservoir Nanoparticles Reveal Stability, High Rates of Recovery," Journal of Petroleum Technology, 64 (11):92-99 (Nov. 2012).
Palmer, F.S., et al., "Design and Implementation of Immiscible Carbon Dioxide Displacement Projects (CO2 Huff-Puff) in South Louisiana," Society of Petroleum Engineers, SPE 15497, 10 pages (1986).
Shafiq, M.U., et al., "Sandstone Matrix Acidizing Knowledge and Future Development," Journal of Petroleum Exploration and Production Technology, 7 (4):1205-1216 (Dec. 2017).
Skauge, T., et al., "Nano-sized Particles for EOR" SPE International, SPE 129933, Society of Petroleum Engineers (Apr. 2010).
Syfan, F.E., et al., "Enhancing Delaware Basin Stimulation Results Using Nanoparticle Dispersion Technology," Society of Petroleum Engineers, SPE-189876-MS, 24 pages (2018).
Wang et al., "Waterless fracturing technologies for unconventional reservoirs—opportunities for liquid nitrogen" Journal of Natural Gas Science and Engineering, 35:160-174 (2016).
Wasan, D., et al., "Spreading of Nanofluids on Solids," Nature, 423:156-159 (May 2003).
Wei et al., "Mechanisms of N2 and CO2 Assisted Steam Huff-n-Puff Process in Enhancing Heavy Oil Recovery: A Case Study Using Experimental and Numerical Simulation," Society of Petroleum Engineers, SPE-183871-MS, 12 pages (2017).
Partial English translation of title page and claims of Chinese Publication No. 101735787 A, published Jun. 16, 2010.
Partial English translation of title page and claims of Chinese Publication No. 102838981 A, published Dec. 26, 2012.
Partial English translation of title page and claims of Chinese Publication No. 106085401 A, published Nov. 6, 2016.
English translation of the Written Opinion for International Application No. PCT/JP2018/033831, Japan Patent Office, dated Nov. 13, 2018, 6 pages.
Written Opinion for International Application No. PCT/JP2018/033831, Japan Patent Office, dated Nov. 13, 2018, 5 pages.
English machine translation of Korean Patent Publication No. 101872020 B1, published Jun. 27, 2018.
Sears, "Determination of Specific Surface Area of Colloidal Silica by Titration with Sodium Hydroxide," Analytical Chemistry, 28:12, pp. 1981-1983 (Dec. 1956).
English machine translation of Japanese Patent Application No. H01-035157, published Jul. 24, 1989.
English machine translation of Japanese Patent Publication No. H05-086989, published Dec. 15, 1993.
Final Office Action dated Jan. 4, 2019, in U.S. Appl. No. 15/946,252.
Non-Final Office Action dated Jan. 31, 2019, in U.S. Appl. No. 16/179,676.
Non-Final Office Action dated Feb. 27, 2019, in U.S. Appl. No. 16/129,688.
Non-Final Office Action dated Feb. 28, 2019, in U.S. Appl. No. 16/129,705.
Final Office Action dated Aug. 19, 2019, in U.S. Appl. No. 16/179,676.
Non-Final Office Action dated Jul. 12, 2019, in U.S. Appl. No. 15/946,252.
Non-Final Office Action dated Aug. 1, 2019, in U.S. Appl. No. 16/374,060.
Non-Final Office Action dated Nov. 5, 2019, in U.S. Appl. No. 16/141,824.
Final Office Action dated Mar. 20, 2019, in U.S. Appl. No. 16/141,824.
International Search Report and Written Opinion dated Feb. 6, 2020 in International Application No. PCT/US2019/059417.

* cited by examiner

Modern Proppant Choices

*List not complete. Some names are registered trademarks, some historical*

| Sand | Lightweight Ceramic | Intermediate Density Ceramic | High Density Ceramic |
|---|---|---|---|

| Other | Sand | Lightweight Ceramic | Intermediate Density Ceramic | High Density Ceramic |
|---|---|---|---|---|
| CARBOTag | Ottawa | HYDROPROP | CARBOPROP | CARBOHSP |
| CARBONRT | Jordan | ECONOPROP | ISP, InterProp | Sintered Bauxite |
| ScaleProp | Hickory | CARBOLITE | | |
| | Badger | | SinterLite | SinterBall |
| LiteProp 105, 125, 175 | Brady | ValueProp | VersaProp (broad sieve) | UltraProp (broad sieve) |
| | Colorado Silica | NapLite | | |
| | Arizona | | BoroProp | |
| | White/Brown | | ForoProp | |

--- Numerous Chinese Suppliers---

| With Resins: | | | | |
|---|---|---|---|---|
| | AcFrac CR, PR, Black | CARBOBond | CARBOBond | CARBOBond |
| PR typically denotes pre-cured, CR=curable | Tempered/Super TF | Ceramax E/I | Ceramax V | Ceramax P |
| | OptiProp | MagnaProp | | HyperProp |
| | Super HS (usually sand) | EconoFlex | | |
| LC = low cost | XRTGold | DynaProp | | |
| DC = dual coat | | | | |

*Numerous resins on any substrate (Norcote, Tempered LC, DC, HS, XRT resins)*

ENHANCED OIL RECOVERY USING TREATMENT FLUIDS COMPRISING COLLOIDAL SILICA WITH A PROPPANT

FIELD OF THE INVENTION

The present invention relates to improved oil recovery methods using known proppants in combination with treatment fluids comprising colloidal silica.

BACKGROUND OF THE INVENTION

A proppant is a solid material, typically sand, treated sand or man-made ceramic materials, designed to keep an induced hydraulic fracture open, during or following a fracturing treatment. It is added to a fracking fluid which may vary in composition depending on the type of fracturing used, and can be gel, foam or slickwater-based. In addition, there may be unconventional fracking fluids. Fluids make tradeoffs in such material properties as viscosity, where more viscous fluids can carry more concentrated proppant; the energy or pressure demands to maintain a certain flux pump rate (flow velocity) that will conduct the proppant appropriately; pH, various rheological factors, among others. In addition, fluids may be used in low-volume well stimulation of high-permeability sandstone wells (20 k to 80 k gallons per well) to the high-volume operations such as shale gas and tight gas that use millions of gallons of water per well.

Although hydraulic fracturing was first performed in 1947 (in Kansas, using sand from the Arkansas river), widespread experimentation didn't occur until the Barnett Shale play in the 80 s, and usage has exploded in the first decade of this century.

Initially, proppant was simply sand, but over time other materials have been incorporated. There are resin-coated sands, ceramic-coated sands, and now we have proppant composed of sintered (powdered) bauxite—and ceramic materials made from it.

Although sand is a common proppant, untreated sand is prone to significant fines generation; fines generation is often measured in wt % of initial feed. A commercial newsletter from Momentive cites untreated sand fines production to be 23.9% compared with 8.2% for lightweight ceramic and 0.5% for their product. One way to maintain an ideal mesh size (i.e. permeability) while having sufficient strength is to choose proppants of sufficient strength; sand might be coated with resin, to form CRCS (Curable Resin Coated Sand) or PRCS (Pre-Cured Resin Coated Sands).

U.S. Pat. No. 10,113,406B1, "Pulsed Hydraulic Fracturing with NanoSilica Carrier Fluid", issued Oct. 30, 2018, to Saudi Arabian Oil Company of Dhahran, Saudi Arabia. The invention described and claimed herein relates to fracturing a reservoir includes providing a pad fluid to the reservoir via a wellbore in a well to create fractures in the reservoir, providing a fracturing fluid to the fractures via the wellbore, providing a nanosilica carrier fluid to the fractures via the wellbore, activating the nanosilica particles with an activator to yield a nanosilica gel, and shutting in the wellbore at a wellbore pressure, thereby allowing the nanosilica gel to form proppant pillars in the fractures. The nanosilica carrier fluid includes nanosilica particles. The nanosilica carrier fluid is provided to the fractures and it comprises pulsing quantities a the nanosilica carrier fluid into a continuous flow of the fracturing fluid or alternately pulsing quantities of the nanosilica carrier fluid and the fracturing fluid. An elapsed time between pulsing the quantities of the nanosilica carrier fluid is between 2 seconds and 10 minutes.

U.S. Pat. No. 9,512,352 B2, "Well Treatment Fluids and Methods Utilizing Nano-Particles", issued Dec. 6, 2016 and is assigned to Halliburton Energy Services, Inc. of Houston, Tex. Well treatment fluids and methods that utilize nano-particles are described and claimed. Exemplary nano-particles are selected from the group consisting of particulate nano-silica, nano-alumina, nano-zinc oxide, nano-boron, nano-iron oxide, and combinations thereof. Embodiments also relate to methods of cementing that include the use of nano-particles. An exemplary method of cementing comprises introducing a cement composition into a subterranean formation, wherein the cement composition comprises cement, water and a particulate nano-silica. Embodiments also relate to use of nano-particles in drilling fluids, completion fluids, simulation fluids, and well clean-up fluids.

U.S. Pat. No. 9,951,267, "Infused and Coated Proppant Containing Chemical Treatment Agents and Methods of Using Same", issued Apr. 24, 2018, to Carbo Ceramics Inc. of Houston, Tex., This patent claims a proppant composition for use in hydraulic fracturing, the composition comprising: a plurality of particulates; a non-degradable coating; and at least one particulate of the plurality of particulates comprising a degradable shell encapsulating at least a portion of the non-degradable coating, and a chemical treatment agent, the at least one particulate having a long term permeability measured in accordance with ISO 13503-5 at 7,500 psi of at least about 10 D; wherein the particulate is a porous particulate; and wherein the at least one chemical treatment agent separates from the at least one particulate when located inside a fracture of a subterranean formation after a period of time.

U.S. Pat. No. 9,234,127, "Angular Abrasive Proppant, Process for the Preparation Thereof and Process for Hydraulic Fracturing of Oil and Gas Wells, issued on Jan. 12, 2016 to Mineracao Curbimba Ltda of Brazil. This invention is an angular abrasive proppant comprising angular sintered particles of a material selected from bauxite, clay-minerals and mixtures thereof, with particle sizes varying from 30 mesh to 150 mesh. A process for the production of an angular abrasive proppant comprising sintered particles of a material selected from bauxite, clay-minerals, and mixtures thereof comprises the steps of drying, grinding, pelletizing and sintering a bauxite starting material, grinding the sintered pellets, and sizing said particles to a particle size varying from 35 to 150 mesh is also described. A hydraulic fracturing process uses as proppant the angular abrasive proppant as described above.

U.S. Pat. No. 7,954,548, "Proppant for Hydraulic Fracturing of Oil and Gas Wells" issued on Jun. 7, 2011 to Mineracao Curimbaba Ltda. of Brazil. This patent describes and claims a proppant for the hydraulic fracturing oil or gas wells, which consists of a mixture of from 10 to 95% by weight of a spherical proppant and from 5 to 90% by weight of an angular material, the percentages being based on the total weight of the mixture. The proppant obtained according to the present invention is useful for eliminating or decreasing the "flow-back" phenomenon in operations in oil or gas wells.

U.S. Pat. No. 7,482,310 B1, "Method of Fracturing Subterranean Formations Utilizing Emulsions Comprising Acrylamide Copolymers, issued on Jan. 27, 2009 to Kroof Chemical Company, Inc. and Superior Well Services, Inc., both of Pennsylvania. A method of treating a subterranean formation penetrated by a well bore is described and claimed. This method includes the steps of (a) preparing a fracturing fluid containing a mixture resulting from: (I) providing a water-in-oil emulsion composition that includes: (i) 5% to 99% by weight of a water-in-oil emulsion polymer comprising, a polymer or copolymer containing repeat units from an acrylamide monomer; (ii) 0.5% to 90% by weight of a carrier solvent; and (iii) 0 to 90% by weight of a fluidizing agent; and adding 0.1% to 10% by weight of one or more inorganic microparticles, where the total of all components is 100% by weight; and (II) adding the water-in-oil emulsion composition to water; and (b) contacting the subterranean formation with the fracturing fluid.

WO 2018/187550 A1, "Brine Resistant Silica Sol", Published on Oct. 11, 2018 and is assigned to Nissan Chemical America Corporation (the same assignee of the instant patent application.) A brine resistant silica sol is described and claimed. This brine resistant silica sol comprises an aqueous colloidal silica mixture that has been surface functionalized with at least one moiety selected from the group consisting of a monomeric hydrophilic organosilane, a mixture of monomeric hydrophilic organosilane(s) and monomeric hydrophobic organosilane(s), or a polysiloxane oligomer, wherein the surface functionalized brine resistant aqueous colloidal silica sol passes at least two of three of these brine resistant tests: API Brine Visual, 24 Hour Seawater Visual and API Turbidity Meter.

US 2015/0292308 A1, "Stimulation of Wells in Nano-Darcy Shale Formations", Published on Oct. 15, 2018, and is assigned to Flex-Chem Holding Company, LLC of Weatherford, Okla. This patent application issued on Apr. 17, 2018 as U.S. Pat. No. 9,944,843 B2. This patent describes and claims formulations and methods for stimulating the production from wells in nano-darcy shale formations. In one embodiment, the method includes injecting a treatment mixture containing a metal complexing agent into a nano-darcy shale formation adjacent to a well at a pressure below the fracture pressure of the formation. A sufficient contact time is allowed and then the treatment mixture is pumped from the subsurface. This has been shown to stimulate well production in shale formations. Without being held to a particular theory it appears that the metal complexing agent is binding with naturally occurring metals in the shale formation, and particularly divalent metal ions, which are then extracted with the spent fluid. This removal of naturally occurring metals may be increasing the permeability of the formation in the contact region adjacent to the well, thereby causing the Observed increased production.

US 2014/0374095 A1, "Nanoparticle Slurries and Methods", Published on Dec. 25, 2014 and is assigned to Schlumberger Technology Corporation of Sugar Land, Tex., and is now abandoned. This patent application describes and claims fluids comprising elongated nanoparticles and methods of using the fluids in treating a subterranean formation penetrated by a wellbore.

US 2014/0338906 A1, entitled "Proppant With Enhanced Interparticle Bonding", Published on Nov. 20, 2014 and is assigned to Preferred Technology, LLC of Radnor, Pa. This patent application issued on Oct. 16, 2018 as U.S. Pat. No. 10,100,247 B2. In this patent application, polymer-coated proppants for hydraulic fracturing of oil and gas wells have an outer layer portion that comprises an organofunctional coupling agent, preferably an organofunctional silane coupling agent are described and claimed. The use of an organofunctional silane coupling agent in the outer layer portion of the proppant coating is preferably chosen to expose functionalities that will be reactive towards similar functionalities of adjacent and similarly coated proppants so that, when introduced downhole, these proppants form interparticle bonds at the temperatures and crack closure pressures found downhole in fractured strata. Such enhanced interparticle bonding helps keep the proppant in the fracture and maintains conductivity with reduced flowback. The invention also helps proppants designed for low temperature well to bond more firmly and allows proppants designed for high temperature wells to bond well even at lower downhole temperatures, thereby extending their useful range.

WO 2014/176188 A1, "Process for Treating and Recycling Hydraulic Fracturing Fluid", Published on Oct. 30, 2014 and is assigned to E.I. DuPont de Nemours and Company of Wilmington, Del. A method for treating hydraulic fracturing fluid is disclosed. The hydraulic fracturing fluid is treated with an anionic silica-based colloid in an amount and for a sufficient time to coagulate certain contaminants contained in the hydraulic fracturing fluid. The contaminants can thereafter be removed from the hydraulic fracturing fluid.

WO 2013/192634 A2, "Self-Suspending Proppants for Hydraulic Fracturing", Published on Dec. 27, 2013, assigned to Self-Suspending Proppant LLC. This patent application describes and claims modified proppants, comprising a proppant particle and a hydrogel coating, wherein the hydrogel coating localizes on the surface of the proppant particle to produce the modified proppant. Methods of manufacturing such proppants and methods of use are also included.

US 2010/0147515 A1, "Surface Modification for Cross-Linking or Breaking Interactions with Injected Fluid", Published on Jun. 17, 2010, issued as U.S. Pat. No. 8,360,149 B2 on Jan. 29, 2013, and is assigned to Schlumberger Technology Corporation. A method and apparatus for treating a subterranean formation with a fluid, including forming a fluid including a organosilane and a particulate and introducing the fluid into a subterranean formation with exposed surfaces, wherein the organosilane modifies the particulate or surfaces or both is described and claimed. Also, a method and apparatus for treating a subterranean formation with a fluid, including forming a fluid including an organosilane and introducing the fluid into a subterranean formation with exposed surfaces, wherein the organosilane modifies the surfaces with a first functional group.

"Oilfield Applications of Colloidal Silica Gel", published in November of 1991 by the Society of Petroleum Engineers, authors: J. J. Jurinak (Conoco Inc.) and L. E. Summers (Conoco Inc.), Document ID:SPE-18505-PA, describes the development of a practical reservoir fluid flow control system based on colloidal silica gel.

Commercially available ceramic proppants are available from Carbo, http://www.carboceramics.com/products-and-services/fracture-technologies/ceramic-proppant. CARBO is an industry-leading technology and service company that provides engineered oilfield production enhancement, industrial performance enhancement, and environmental protection solutions. Carbo's corporate headquarters are located at Energy Center II, 575 N. Dairy Ashford Rd., Suite 300, Houston, Tex., USA 77079.

These are considerations when selecting proppants (as shown in https://info.drillinginfo.com/proppant-the-greatest-oilfield-innovation/)

Size—the physical size of the proppant needs to be adjustable per the condition of the rock. Typically measured between 8 and 140 mesh (106 μm-2.36 mm).

Geometry—in some cases the shape of the proppant needs to be adjusted.

Weight—largely depending on the depth of the frac the density of the proppant will need to be adjusted.

Some important measured qualities of proppant are:
Conductivity—basically the amount of flow that the proppant will allow.
Crush Resistance—deeper wells and varied lithologies require different stress properties.
Acid Solubility—tests of solubility in acid can indicate contaminants, and let you know how the proppant is likely to perform underground.

Nissan Chemical America Corporation offers colloidal silica products for sale as well as fluids incorporating colloidal silica products. https://www.nissanchem-usa.com/ Nissan Chemical America Corporation, is a New York corporation having a place of business at 10333 Richmond Avenue, Suite 1100, Houston, Tex. 77042 acting in its own name and in the name of its parent company, Nissan Chemical Corporation, having offices at 5-1, Nihonbashi 2-Chome, Chuo-ku, Tokyo 103-6119, Japan.

Improved oil recovery treatment methods are well established in the oil industry. What would be desirable are modifications to existing EOR methods to increase the recovery of oil from an underperforming oil well using engineered nanoparticles or colloidal particle-based treatment fluids.

SUMMARY OF THE INVENTION

The first aspect of the instant claimed invention is a method of increasing production from a hydrocarbon containing formation by adding a proppant to the formation, characterized in that a treatment fluid comprising a colloidal silica nanoparticle is added to the formation before, during or after the time the proppant is added to the formation.

The second aspect of the invention is the method of the first aspect, characterized in that the treatment fluid comprising the colloidal silica nanoparticles is added to the formation before the time the proppant is added to the formation.

The third aspect of the invention is the method of the first aspect of the invention, characterized in that the treatment fluid comprising the colloidal silica nanoparticles is added to the formation during the time the proppant is added to the formation.

The fourth aspect of the invention is the method of the first aspect of the invention, characterized in that the treatment fluid comprising the colloidal silica nanoparticles is added to the formation after the time the proppant is added to the formation.

The fifth aspect of the invention is the method of the first aspect of the invention characterized in that the treatment fluid comprising the colloidal silica nanoparticles is added to the formation before and during the time the proppant is added to the formation.

The sixth aspect of the invention is the method of first aspect of the invention characterized in that the treatment fluid comprising the colloidal silica nanoparticles is added to the formation during and after the time the proppant is added to the formation.

The seventh aspect of the invention is the method of the first aspect of the invention characterized in that the treatment fluid comprising the colloidal silica nanoparticles is added to the formation before and after the time the proppant is added to the formation.

The eighth aspect of the invention is the method of any one of the first through seventh aspects of the invention, wherein the treatment fluid comprising a colloidal silica nanoparticle is a crude oil recovery chemical solution comprising a silane compound, an aqueous silica sol having an average particle size of from about 3 nm to about 200 nm.

The ninth aspect of the invention is the method of the eighth aspect of the invention, wherein the aqueous silica sol comprises silica particles in which at least a part of the silane compound is bonded on the surface of at least a part of the silica particles in the sol.

The tenth aspect of the invention is the method of eighth or ninth aspect of the invention, wherein the silane compound is at least one compound selected from the group consisting of a silane coupling agent having at least one organic functional group selected from the group consisting of a vinyl group, an ether group, an epoxy group, a styryl group, a methacryl group, an acryl group, an amino group, an isocyanurate group, an alkoxysilane group, a silazane group and a siloxane group.

The eleventh aspect of the invention is the method of any one of the eighth, ninth or tenth aspects of the invention, wherein the aqueous silica sol is present in an amount of from about 0.1% by mass to about 20% by mass, based on the total mass of the crude oil recovery chemical solution, in terms of silica slid content.

The twelfth aspect of the invention is the method of any one of the $1^{st}$ through $11^{th}$ aspects of the invention, wherein the proppant is sand.

The thirteenth aspect of the invention is the method of the $12^{th}$ aspect of the invention, wherein the sand is 20 mesh, 40 mesh, 70 mesh, or 100 mesh.

The fourteenth aspect of the instant claimed invention is the method of the twelfth aspect of the invention, wherein the sand is a combination of 100 mesh and 40 mesh, a combination of 70 mesh and 40 mesh, or a combination of 40 mesh and 20 mesh.

The fifteenth aspect of the invention is the method of the first aspect of the invention, wherein the proppant is coated with the treatment fluid comprising colloidal silica nanoparticles.

BRIEF DESCRIPTION OF THE DRAWINGS

FIG. 1 Shows Modern Proppant Choices

DETAILED DESCRIPTION OF THE INVENTION

The first aspect of the instant claimed invention is a method of increasing production from a hydrocarbon containing formation by adding a proppant to the formation, wherein a treatment fluid comprising a colloidal silica nanoparticle is added to the formation before, during or after the time the proppant is added to the formation.

The proppant materials that are intended to stay within the hydrocarbon-bearing formation are referred to as the proppant pack. Proppants are commercially available and come in many different shapes and sizes and compositions. See FIG. 1 for an illustration of commercially available Proppants.

Nanoparticle-based fluids are used in hydraulic fracturing procedures to improve the recovery of oil and gas hydrocarbons. In a current process, a nanoparticle-based hydrocarbon recovery fluid is pumped down an oil well in one portion, referred to as a "pill", directly prior to pumping a pad stage, i.e. nanoparticle-based Hydrocarbon Recovery fluid is pumped as a pre-pad pill. The pad stage during a fracture stimulation job consists of pumping a fracturing fluid which initiates and propagates the fracture in a formation. The pad stage is followed by a slurry/proppant stage where both fluid and proppant are pumped to keep the created fractures open and provide conductivity to the wellbore. The slurry/proppant stage is usually followed by a flush stage. In this way the nanoparticle-based fluid is forced into the induced and secondary fracture network of a hydraulically-fractured or re-fractured well to affect intimate contact of nanoparticle-based fluid with hydrocarbons existing in the fracture network. This occurs before induced fractures are created and further "propped" open by the proppant materials pumped into the oil well during the Proppant stage.

When the proppant stage is finished, fluids may be pumped from the surface through the proppant materials to affect different desired outcomes. A nanoparticle-based fluid may be pumped after the proppant stage as a post-proppant/pre-flush pill to affect deposition of the engineered nanoparticles onto the surfaces of the proppant materials after this fluid stage is allowed to flow back over the proppant pack. A nanoparticle-based fluid may also be pumped as a pre-pad pill, during the pad stage or with the proppant in the slurry/proppant stage concurrently.

During the flowback/production phase, and as fluids flow out of the freshly fractured/re-fractured oil well to the surface, the fluids experience a drop in temperature and pressure. The change in temperature and pressure conditions may cause several types of precipitation of dissolved species which may negatively affect the performance of the well.

From the hydrocarbon phase, relatively high molecular weight paraffins may be caused to precipitate out of the hydrocarbon solution. This precipitation may occur within the proppant pack, near well bore or in tubulars (aka piping). This may cause paraffins to be deposited onto the surface of the proppant materials, effectively reducing the permeability and/or fluid conductivity of the proppant pack. From the aqueous phase, dissolved salts and/or minerals may also experience precipitation onto available surfaces as the fluid experiences reduced temperature and pressure on the way out of the well. These precipitated salts and minerals are typically referred to as "scale".

It has been found that an appropriately formulated nanoparticle-based fluid can be formulated to deposit the designed nanoparticles deliberately onto the surface of proppant particles before or during the flowback/production phase. This deposition process may be designed to occur after a nanoparticle-based fluid is pumped as a pre-pad pill, during the pad stage, in the slurry/proppant stage, as a post-proppant/pre-flush pill and as the frac fluids flow back after the well is completed.

The deposition of the proper type of nanoparticles onto the surfaces of proppant materials is expected to reduce the tendency of paraffins and scale to nucleate and form deposits onto the surfaces of proppant materials. This, in turn, will mitigate the reduction in permeability/fluid conductivity through the proppant pack and allow desirable hydrocarbons to be produced more efficiently and for a longer period of time from the well.

In addition to providing paraffin and scale control an appropriately formulated nanoparticle-based fluid can aid in the flowback of desirable oil and gas. An appropriately formulated nanoparticle-based fluid can also effectively act as a friction reducing agent, which can be observed by a pressure drop during pumping when the particles are first pumped downhole as well as the reduced pressure required to produce oil from the treated well. This friction-reduction property can also be observed as a reduced need for artificial lift in a typical well where artificial lift is usually required.

This deliberate deposition of nanoparticles can also be applied to the induced fracture network within the formation, the secondary/existing fracture network within the formation, and the "tubulars" or piping that is used to conduct fluids up out of the formation to the surface.

Engineered nanoparticles are expected to reduce the tendency of high molecular weight hydrocarbons such as paraffin and scale to nucleate onto available surfaces and cause a reduction in recovery of desirable hydrocarbons.

EXAMPLE

In the following potential examples, each ingredient that is used to create a surface treated colloidal silica, is listed as Parts of Ingredient, per 100 parts of surface treated colloidal silica.

ST-O25 and ST-32C are commercially available colloidal silicas from Nissan Chemical America Corporation, located at 10333 Richmond Avenue, Suite 1100 Houston, Tex. 77042 or from Nissan Chemical Corporation, located at 5-1, Nihonbashi 2-Chome, Chuo-ku, Tokyo 103-6119, Japan.

The first set of Examples focuses on the synthesis of brine resistant colloidal silicas.

| Ingredients | Examples | | | | | |
| --- | --- | --- | --- | --- | --- | --- |
| | 1 | 2 | 3 | 4 | 5 | 6 |
| ST-O25 | 76 | 76 | 76 | 76 | 76 | 76 |
| Deionized water | 11.1 | 11.1 | 11.1 | 11.1 | 11.1 | 11.1 |
| Propylene Glycol | 10 | 10 | 10 | 10 | 10 | 10 |
| 3-(Triethoxysilyl)propyl Succinic Anhydride | 2.9 | | | | 1.9 | 1.9 |
| N-(Triethoxysilylpropyl)-O-Polyethyleneoxide Urethane | | 2.9 | | | | |
| Silane, trimethoxy[3-(oxiranyl methoxy)propyl] | | | 2.9 | | | |
| 3-Ureidopropyl Triethoxysilane | | | | 2.9 | | |
| 2-(3,4 epoxycyclohexyl)-ethyltrimethoxysilane | | | | | 1 | |
| 3-(Trimethoxysilyl)propyl Methacrylate | | | | | | 1 |
| Total | 100.00 | 100.00 | 100.00 | 100.00 | 100.00 | 100.00 |

-continued

| Ingredients | Examples | | | | | | |
|---|---|---|---|---|---|---|---|
| | 7 | 8 | 9 | 10 | 11 | 12 | 13 |
| ST-O25 | 76 | 76 | 76 | 76 | 76 | 76 | 76 |
| Deionized water | 11.1 | 11.1 | 11.1 | 11.1 | 11.1 | 11.1 | 11.1 |
| Propylene Glycol | 10 | 10 | 10 | 10 | 10 | 10 | 10 |
| 3-(Triethoxysilyl)propyl Succinic Anhydride | 1.9 | 1.9 | 1.9 | 1.9 | 1.9 | 1.9 | 1.9 |
| Hexamethyl Disiloxane | 1 | | | | | | |
| Hexamethyl Disilazane | | 1 | | | | | |
| Trimethoxy Methyl Silane | | | 1 | | | | |
| Trimethoxy Phenyl Silane | | | | 1 | | | |
| Vinyl Trimethoxysilane | | | | | 1 | | |
| 3-(N,N-Dimethylaminopropyl)-Trimethoxysilane | | | | | | 1 | |
| 3-(Diethylamino)propyl trimethoxysilane | | | | | | | 1 |
| Total | 100 | 100 | 100 | 100 | 100 | 100 | 100 |

| Ingredients | Examples | | | | | | | |
|---|---|---|---|---|---|---|---|---|
| | 14 | 15 | 16 | 17 | 18 | 19 | 20 | 21 |
| ST-O25 | 76 | 76 | 76 | 76 | 76 | 76 | 76 | 76 |
| Deionized water | 11.1 | 11.1 | 11.1 | 11.1 | 11.1 | 11.1 | 11.1 | 11.1 |
| Propylene Glycol | 10 | 10 | 10 | 10 | 10 | 10 | 10 | 10 |
| 3-(Triethoxysilyl)propyl Succinic Anhydride | 1.9 | 1.9 | 1.9 | 1.9 | 1.9 | 1.9 | 1.9 | 1.9 |
| Trimethoxy(octadecyl)silane | 1 | | | | | | | |
| Isobutyl Trimethoxysilane | | 1 | | | | | | |
| Hexyltrimethoxysilane | | | 1 | | | | | |
| Decyltrimethoxysilane | | | | 1 | | | | |
| Isooctyltrimethoxysilane | | | | | 1 | | | |
| Hexadecyltrimethoxysilane | | | | | | 1 | | |
| Propyltrimethoxysilane | | | | | | | 1 | |
| Octyltriethoxysilane | | | | | | | | 1 |
| Total | 100 | 100 | 100 | 100 | 100 | 100 | 100 | 100 |

| Ingredients | Examples | | | | | | | |
|---|---|---|---|---|---|---|---|---|
| | 22 | 23 | 24 | 25 | 26 | 27 | 28 | 29 | 30 |
| ST-O25 | 70 | 80 | 75 | 72 | 76 | 76 | 76 | 76 | 76 |
| Deionized water | 14.1 | 19.1 | 11.1 | 13.1 | 11.1 | 11.1 | 11.1 | 11.1 | 11 |
| Propylene Glycol | 13 | 8 | 10 | 12 | 10 | 10 | 10 | 10 | 10 |
| 3-(Triethoxysilyl)propyl Succinic Anhydride | 2.9 | | | | | | | | |
| N-(Triethoxysilylpropyl)-O-Polyethyleneoxide Urethane | | 2.9 | | | 1.9 | 1.9 | 1.9 | 1.9 | 1.9 |
| Silane, trimethoxy[3-(oxiranyl methoxy)propyl] | | | 3.9 | | | | | | |
| 3-Ureidopropyl Triethoxysilane | | | | 2.9 | | | | | |
| 2-(3,4 epoxycyclohexyl)-ethyltrimethoxysilane | | | | | 1 | | | | |
| 3-(Trimethoxysilyl)propyl Methacrylate | | | | | | 1 | | | |
| Hexamethyl Disiloxane | | | | | | | 1 | | |
| Hexamethyl Disilazane | | | | | | | | 1 | |
| Trimethoxy Methyl Silane | | | | | | | | | 1 |
| Total | 100 | 100 | 100 | 100 | 100 | 100 | 100 | 100 | 100 |

| Ingredients | Examples | | | | | | |
|---|---|---|---|---|---|---|---|
| | 31 | 32 | 33 | 34 | 35 | 36 | 37 |
| ST-O25 | 76 | 76 | 76 | 76 | 76 | 76 | 76 |
| Deionized water | 11.1 | 11.1 | 11.1 | 11.1 | 11.1 | 11.1 | 11.1 |
| Propylene Glycol | 10 | 10 | 10 | 10 | 10 | 10 | 10 |
| N-(Triethoxysilylpropyl)-O-Polyethyleneoxide Urethane | 1.9 | 1.9 | 1.9 | 1.9 | 1.9 | 1.9 | 1.9 |

-continued

| Ingredients | | | | | | | |
|---|---|---|---|---|---|---|---|
| Trimethoxy Phenyl Silane | 1 | | | | | | |
| Vinyl Trimethoxysilane | | 1 | | | | | |
| 3-(N,N-Dimethylaminopropyl)-Trimethoxysilane | | | 1 | | | | |
| 3-(Diethylamino)propyl trimethoxysilane | | | | 1 | | | |
| Trimethoxy-(octadecyl)silane | | | | | 1 | | |
| Isobutyl Trimethoxysilane | | | | | | 1 | |
| Hexyl-trimethoxysilane | | | | | | | 1 |
| Total | 100 | 100 | 100 | 100 | 100 | 100 | 100 |

| | Examples | | | | |
|---|---|---|---|---|---|
| Ingredients | 38 | 39 | 40 | 41 | 42 |
| ST-O25 | 76 | 76 | 76 | 76 | 76 |
| Deionized water | 11.1 | 11.1 | 11.1 | 11.1 | 11.1 |
| Propylene Glycol | 10 | 10 | 10 | 10 | 10 |
| N-(Triethoxysilylpropyl)-O-Polyethyleneoxide Urethane | 1.9 | 1.9 | 1.9 | 1.9 | 1.9 |
| Decyl-trimethoxysilane | 1 | | | | |
| Isooctyl-trimethoxysilane | | 1 | | | |
| Hexadecyl-trimethoxysilane | | | 1 | | |
| Propyl-trimethoxysilane | | | | 1 | |
| Octyl-triethoxysilane | | | | | 1 |
| Total | 100.00 | 100.00 | 100.00 | 100.00 | 100.00 |

| | Examples | | | | | | | | |
|---|---|---|---|---|---|---|---|---|---|
| Ingredients | 43 | 44 | 45 | 46 | 47 | 48 | 49 | 50 | 51 |
| ST-O25 | 76 | 76 | 70 | 80 | 76 | 76 | 76 | 76 | 76 |
| Deionized water | 10 | 9 | 16.1 | 11.1 | 11.1 | 11.1 | 11.1 | 11.1 | 11 |
| Propylene Glycol | 11.1 | 12.1 | 11 | 6 | 10 | 10 | 10 | 10 | 10 |
| 3-(Triethoxysilyl)propyl Succinic Anhydride | 2.9 | | | | | | | | |
| N-(Triethoxysilylpropyl)-O-Polyethyleneoxide Urethane | | 2.9 | | | | | | | |
| Silane, trimethoxy[3-(oxiranyl methoxy)propyl] | | | 2.9 | | 1.9 | 1.9 | 1.9 | 1.9 | 1.9 |
| 3-Ureidopropyl Triethoxysilane | | | | 2.9 | | | | | |
| 2-(3,4 epoxycyclohexyl)-ethyltrimethoxysilane | | | | | 1 | | | | |
| 3-(Trimethoxysilyl)propyl Methacrylate | | | | | | 1 | | | |
| Hexamethyl Disiloxane | | | | | | | 1 | | |
| Hexamethyl Disilazane | | | | | | | | 1 | |
| Trimethoxy Methyl Silane | | | | | | | | | 1 |
| Total | 100 | 100 | 100 | 100 | 100 | 100 | 100 | 100 | 100 |

| | Examples | | | | | | |
|---|---|---|---|---|---|---|---|
| Ingredients | 52 | 53 | 54 | 55 | 56 | 57 | 58 |
| ST-O25 | 76 | 76 | 76 | 76 | 76 | 76 | 76 |
| Deionized water | 11.1 | 11.1 | 11.1 | 11.1 | 11.1 | 11.1 | 11.1 |
| Propylene Glycol | 10 | 10 | 10 | 10 | 10 | 10 | 10 |
| Silane, trimethoxy[3-(oxiranyl methoxy)propyl] | 1.9 | 1.9 | 1.9 | 1.9 | 1.9 | 1.9 | 1.9 |
| Trimethoxy Phenyl Silane | 1 | | | | | | |
| Vinyl Trimethoxysilane | | 1 | | | | | |
| 3-(N,N-Dimethylaminopropyl)-Trimethoxysilane | | | 1 | | | | |
| 3-(Diethylamino)propyl trimethoxysilane | | | | 1 | | | |
| Trimethoxy(octadecyl)silane | | | | | 1 | | |

-continued

| | | | | | | | |
|---|---|---|---|---|---|---|---|
| Isobutyl Trimethoxysilane | | | | | | 1 | |
| Hexyltrimethoxysilane | | | | | | | 1 |
| Total | 100.00 | 100.00 | 100.00 | 100.00 | 100.00 | 100.00 | 100.00 |

Examples

| Ingredients | 59 | 60 | 61 | 62 | 63 |
|---|---|---|---|---|---|
| ST-O25 | 76 | 76 | 76 | 76 | 76 |
| Deionized water | 11.1 | 11.1 | 11.1 | 11.1 | 11.1 |
| Propylene Glycol | 10 | 10 | 10 | 10 | 10 |
| Silane, trimethoxy[3-(oxiranyl methoxy)propyl] | 1.9 | 1.9 | 1.9 | 1.9 | 1.9 |
| Decyltrimethoxysilane | 1 | | | | |
| Isooctyltrimethoxysilane | | 1 | | | |
| Hexadecyltrimethoxysilane | | | 1 | | |
| Propyltrimethoxysilane | | | | 1 | |
| Octyltriethoxysilane | | | | | 1 |
| Total | 100.00 | 100.00 | 100.00 | 100.00 | 100.00 |

Examples

| Ingredients | 64 | 65 | 66 | 67 | 68 | 69 | 70 | 71 | 72 | 73 |
|---|---|---|---|---|---|---|---|---|---|---|
| ST-O25 | 76 | 76 | 76 | 76 | 76 | 76 | 76 | 76 | 76 | 76 |
| Deionized water | 11.1 | 11.1 | 11.1 | 11.1 | 11.1 | 11.1 | 11.1 | 11.1 | 11 | 11.1 |
| Propylene Glycol | 10 | 10 | 10 | 10 | 10 | 10 | 10 | 10 | 10 | 10 |
| 3-(Triethoxysilyl)propyl Succinic Anhydride | 1.45 | | | | | | | | | |
| N-(Triethoxysilylpropyl)-O-Polyethyleneoxide Urethane | 1.45 | 2.9 | | | | | | | | |
| Silane, trimethoxy[3-(oxiranyl methoxy)propyl] | | | 2.9 | | | | | | | |
| 3-Ureidopropyl Triethoxysilane | | | | 2.9 | 1.9 | 1.9 | 1.9 | 1.9 | 1.9 | 1.9 |
| 2-(3,4 epoxycyclohexyl)-ethyltrimethoxysilane | | | | | 1 | | | | | |
| 3-(Trimethoxysilyl)propyl Methacrylate | | | | | | 1 | | | | |
| Hexamethyl Disiloxane | | | | | | | 1 | | | |
| Hexamethyl Disilazane | | | | | | | | 1 | | |
| Trimethoxy Methyl Silane | | | | | | | | | 1 | |
| Trimethoxy Phenyl Silane | | | | | | | | | | 1 |
| Total | 100 | 100 | 100 | 100 | 100 | 100 | 100 | 100 | 100 | 100 |

Examples

| Ingredients | 74 | 75 | 76 | 77 | 78 | 79 | 80 | 81 |
|---|---|---|---|---|---|---|---|---|
| ST-O25 | 76 | 76 | 76 | 76 | 76 | 76 | 76 | 76 |
| Deionized water | 11.1 | 11.1 | 11.1 | 11.1 | 11.1 | 11.1 | 11.1 | 11.1 |
| Propylene Glycol | 10 | 10 | 10 | 10 | 10 | 10 | 10 | 10 |
| 3-Ureidopropyl Triethoxysilane | 1.9 | 1.9 | 1.9 | 1.9 | 1.9 | 1.9 | 1.9 | 1.9 |
| Vinyl Trimethoxysilane | 1 | | | | | | | |
| 3-(N,N-Dimethylaminopropyl)-Trimethoxysilane | | 1 | | | | | | |
| 3-(Diethylamino)propyl trimethoxysilane | | | 1 | | | | | |
| Trimethoxy(octadecyl)silane | | | | 1 | | | | |
| Isobutyl Trimethoxysilane | | | | | 1 | | | |
| Hexyltrimethoxysilane | | | | | | 1 | | |
| Decyltrimethoxysilane | | | | | | | 1 | |
| Isooctyltrimethoxysilane | | | | | | | | 1 |
| Hexadecyltrimethoxysilane | | | | | | | | |
| Propyltrimethoxysilane | | | | | | | | |
| Octyltriethoxysilane | | | | | | | | |
| Total | 100.00 | 100.00 | 100.00 | 100.00 | 100.00 | 100.00 | 100.00 | 100.00 |

-continued

| | Examples | | |
|---|---|---|---|
| Ingredients | 82 | 83 | 84 |
| ST-O25 | 76 | 76 | 76 |
| Deionized water | 11.1 | 11.1 | 11.1 |
| Propylene Glycol | 10 | 10 | 10 |
| 3-Ureidopropyl Triethoxysilane | 1.9 | 1.9 | 1.9 |
| Hexadecyltrimethoxysilane | 1 | | |
| Propyltrimethoxysilane | | 1 | |
| Octyltriethoxysilane | | | 1 |
| Total | 100.00 | 100.00 | 100.00 |

| | Examples | | | | |
|---|---|---|---|---|---|
| Ingredients | 85 | 86 | 87 | 88 | 89 |
| ST-O25 | 76 | 76 | 76 | 76 | 76 |
| Deionized water | 11.1 | 11.1 | 11.1 | 11.1 | 11.1 |
| Ethylene Glycol | 10 | 10 | 10 | 10 | 10 |
| 3-(Triethoxysilyl)propyl Succinic Anhydride | 2.9 | | | | 1.9 |
| N-(Triethoxysilylpropyl)-O-Polyethyleneoxide Urethane | | 2.9 | | | |
| Silane, trimethoxy[3-(oxiranyl methoxy)propyl] | | | 2.9 | | |
| 3-Ureidopropyl Triethoxysilane | | | | 2.9 | |
| 2-(3,4 epoxycyclohexyl)-ethyltrimethoxysilane | | | | | 1 |
| 3-(Trimethoxysilyl)propyl Methacrylate | | | | | |
| Hexamethyl Disiloxane | | | | | |
| Hexamethyl Disilazane | | | | | |
| Total | 100.00 | 100.00 | 100.00 | 100.00 | 100.00 |

| | Examples | | |
|---|---|---|---|
| Ingredients | 90 | 91 | 92 |
| ST-O25 | 76 | 76 | 76 |
| Deionized water | 11.1 | 11.1 | 11.1 |
| Ethylene Glycol | 10 | 10 | 10 |
| 3-(Triethoxysilyl)propyl Succinic Anhydride | 1.9 | 1.9 | 1.9 |
| 3-(Trimethoxysilyl)propyl Methacrylate | 1 | | |
| Hexamethyl Disiloxane | | 1 | |
| Hexamethyl Disilazane | | | 1 |
| Total | 100.00 | 100.00 | 100.00 |

| | Examples | | | | | | |
|---|---|---|---|---|---|---|---|
| Ingredients | 93 | 94 | 95 | 96 | 97 | 98 | 99 |
| ST-O25 | 76 | 76 | 76 | 76 | 76 | 76 | 76 |
| Deionized water | 11.1 | 11.1 | 11.1 | 11.1 | 11.1 | 11.1 | 11.1 |
| Ethylene Glycol | 10 | 10 | 10 | 10 | 10 | 10 | 10 |
| 3-(Triethoxysilyl)propyl Succinic Anhydride | 1.9 | 1.9 | 1.9 | 1.9 | 1.9 | 1.9 | 1.9 |
| Trimethoxy Methyl Silane | 1 | | | | | | |
| Trimethoxy Phenyl Silane | | 1 | | | | | |
| Vinyl Trimethoxysilane | | | 1 | | | | |
| Total | 100.00 | 100.00 | 100.00 | 100.00 | 100.00 | 100.00 | 100.00 |

| | Examples | | | | | |
|---|---|---|---|---|---|---|
| Ingredients | 100 | 101 | 102 | 103 | 104 | 105 |
| ST-O25 | 76 | 76 | 76 | 76 | 76 | 76 |
| Deionized water | 11.1 | 11.1 | 11.1 | 11.1 | 11.1 | 11.1 |
| Ethylene Glycol | 10 | 10 | 10 | 10 | 10 | 10 |

-continued

| Ingredients | | | | | | |
|---|---|---|---|---|---|---|
| 3-(Triethoxysilyl)propyl Succinic Anhydride | 1.9 | 1.9 | 1.9 | 1.9 | 1.9 | 1.9 |
| Hexyltrimethoxysilane | 1 | | | | | |
| Decyltrimethoxysilane | | 1 | | | | |
| Isooctyltrimethoxysilane | | | 1 | | | |
| Hexadecyltrimethoxysilane | | | | 1 | | |
| Propyltrimethoxysilane | | | | | 1 | |
| Octyltriethoxysilane | | | | | | 1 |
| Total | 100.00 | 100.00 | 100.00 | 100.00 | 100.00 | 100.00 |

| | Examples | | | | | | |
|---|---|---|---|---|---|---|---|
| Ingredients | 106 | 107 | 108 | 109 | 110 | 111 | 112 |
| ST-O25 | 78 | 74 | 76 | 76 | 76 | 76 | 76 |
| Deionized water | 11.1 | 11.1 | 11.1 | 11.1 | 11.1 | 11.1 | 11.1 |
| Ethylene Glycol | 8 | 12 | 10 | 10 | 10 | 10 | 10 |
| 3-(Triethoxysilyl)propyl Succinic Anhydride | 1.45 | | | | | | |
| N-(Triethoxysilylpropyl)-O-Polyethyleneoxide Urethane | 1.45 | 1.45 | | | | 1.9 | 1.9 | 1.9 |
| Silane, trimethoxy[3-(oxiranyl methoxy)propyl] | | 1.45 | 1.45 | | | | |
| 3-Ureidopropyl Triethoxysilane | | | 1.45 | 1.45 | | | |
| 2-(3,4 epoxycyclohexyl)-ethyltrimethoxysilane | | | | 1.45 | 1 | | |
| 3-(Trimethoxysilyl)propyl Methacrylate | | | | | | 1 | |
| Hexamethyl Disiloxane | | | | | | | 1 |
| Total | 100.00 | 100.00 | 100.00 | 100.00 | 100.00 | 100.00 | 100.00 |

| | Examples | | | | | |
|---|---|---|---|---|---|---|
| Ingredients | 113 | 114 | 115 | 116 | 117 | 118 |
| ST-O25 | 76 | 76 | 76 | 76 | 76 | 76 |
| Deionized water | 11.1 | 11.1 | 11.1 | 11.1 | 11.1 | 11.1 |
| Ethylene Glycol | 10 | 10 | 10 | 10 | 10 | 10 |
| N-(Triethoxysilylpropyl)-O-Polyethyleneoxide Urethane | 1.9 | 1.9 | 1.9 | 1.9 | 1.9 | 1.9 |
| Hexamethyl Disilazane | 1 | | | | | |
| Trimethoxy Methyl Silane | | 1 | | | | |
| Trimethoxy Phenyl Silane | | | 1 | | | |
| Vinyl Trimethoxysilane | | | | 1 | | |
| 3-(N,N-Dimethylaminopropyl)-Trimethoxysilane | | | | | 1 | |
| 3-(Diethylamino)propyl trimethoxysilane | | | | | | 1 |
| Total | 100.00 | 100.00 | 100.00 | 100.00 | 100.00 | 100.00 |

| | Examples | | | | | | | |
|---|---|---|---|---|---|---|---|---|
| Ingredients | 119 | 120 | 121 | 122 | 123 | 124 | 125 | 126 |
| ST-O25 | 76 | 76 | 76 | 76 | 76 | 76 | 76 | 76 |
| Deionized water | 11.1 | 11.1 | 11.1 | 11.1 | 11.1 | 11.1 | 11.1 | 11.1 |
| Ethylene Glycol | 10 | 10 | 10 | 10 | 10 | 10 | 10 | 10 |
| N-(Triethoxysilylpropyl)-O-Polyethyleneoxide Urethane | 1.9 | 1.9 | 1.9 | 1.9 | 1.9 | 1.9 | 1.9 | 1.9 |
| Trimethoxy(octadecyl)silane | 1 | | | | | | | |
| Isobutyl Trimethoxysilane | | 1 | | | | | | |
| Hexyltrimethoxysilane | | | 1 | | | | | |
| Decyltrimethoxysilane | | | | 1 | | | | |
| Isooctyltrimethoxysilane | | | | | 1 | | | |
| Hexadecyltrimethoxysilane | | | | | | 1 | | |
| Propyltrimethoxysilane | | | | | | | 1 | |
| Octyltriethoxysilane | | | | | | | | 1 |
| Total | 100.00 | 100.00 | 100.00 | 100.00 | 100.00 | 100.00 | 100.00 | 100.00 |

-continued

| | Examples | | | | | | | |
|---|---|---|---|---|---|---|---|---|
| Ingredients | 127 | 128 | 129 | 130 | 131 | 132 | 133 | 134 |
| ST-O25 | 76 | 76 | 78 | 74 | 76 | 76 | 76 | 76 |
| Deionized water | 11.1 | 9.1 | 9.1 | 12.1 | 11.1 | 11.1 | 11.1 | 11.1 |
| Ethylene Glycol | 10 | 12 | 10 | 10 | 10 | 10 | 10 | 10 |
| 3-(Triethoxysilyl)propyl Succinic Anhydride | 1.45 | | | | | | | |
| N-(Triethoxysilylpropyl)-O-Polyethyleneoxide Urethane | | 1.45 | | | | | | |
| Silane, trimethoxy[3-(oxiranyl methoxy)propyl] | 1.45 | | 1.45 | | 1.9 | 1.9 | 1.9 | 1.9 |
| 3-Ureidopropyl Triethoxysilane | | 1.45 | | 1.45 | | | | |
| 2-(3,4 Epoxycyclohexyl)-ethyltrimethoxysilane | | | 1.45 | | 1 | | | |
| 3-(Trimethoxysilyl)propyl Methacrylate | | | | 1.45 | | 1 | | |
| Hexamethyl Disiloxane | | | | | | | 1 | |
| Hexamethyl Disilazane | | | | | | | | 1 |
| Total | 100.00 | 100.00 | 100.00 | 100.00 | 100.00 | 100.00 | 100.00 | 100.00 |

| | Examples | | | | | | |
|---|---|---|---|---|---|---|---|
| Ingredients | 135 | 136 | 137 | 138 | 139 | 140 | 141 |
| ST-O25 | 76 | 76 | 76 | 76 | 76 | 76 | 76 |
| Deionized water | 11.1 | 11.1 | 11.1 | 11.1 | 11.1 | 11.1 | 11.1 |
| Ethylene Glycol | 10 | 10 | 10 | 10 | 10 | 10 | 10 |
| Silane, trimethoxy[3-(oxiranyl methoxy)propyl] | 1.9 | 1.9 | 1.9 | 1.9 | 1.9 | 1.9 | 1.9 |
| Trimethoxy Methyl Silane | 1 | | | | | | |
| Trimethoxy Phenyl Silane | | 1 | | | | | |
| Vinyl Trimethoxysilane | | | 1 | | | | |
| 3-(N,N-Dimethylaminopropyl)-Trimethoxysilane | | | | 1 | | | |
| 3-(Diethylamino)propyl trimethoxysilane | | | | | 1 | | |
| Trimethoxy(octadecyl)silane | | | | | | 1 | |
| Isobutyl Trimethoxysilane | | | | | | | 1 |
| Total | 100.00 | 100.00 | 100.00 | 100.00 | 100.00 | 100.00 | 100.00 |

| | Examples | | | | | |
|---|---|---|---|---|---|---|
| Ingredients | 142 | 143 | 144 | 145 | 146 | 147 |
| ST-O25 | 76 | 76 | 76 | 76 | 76 | 76 |
| Deionized water | 11.1 | 11.1 | 11.1 | 11.1 | 11.1 | 11.1 |
| Ethylene Glycol | 10 | 10 | 10 | 10 | 10 | 10 |
| Silane, trimethoxy[3-(oxiranyl methoxy)propyl] | 1.9 | 1.9 | 1.9 | 1.9 | 1.9 | 1.9 |
| Hexyltrimethoxysilane | 1 | | | | | |
| Decyltrimethoxysilane | | 1 | | | | |
| Isooctyltrimethoxysilane | | | 1 | | | |
| Hexadecyltrimethoxysilane | | | | 1 | | |
| Propyltrimethoxysilane | | | | | 1 | |
| Octyltriethoxysilane | | | | | | 1 |
| Total | 100.00 | 100.00 | 100.00 | 100.00 | 100.00 | 100.00 |

| | Examples | | | | | | |
|---|---|---|---|---|---|---|---|
| Ingredients | 148 | 149 | 150 | 151 | 152 | 153 | 154 |
| ST-O25 | 76 | 76 | 76 | 76 | 76 | 76 | 76 |
| Deionized water | 6.1 | 7.1 | 8.1 | 9.1 | 11.1 | 11.1 | 11.1 |
| Ethylene Glycol | 15 | 14 | 13 | 12 | 10 | 10 | 10 |
| 3-(Triethoxysilyl)propyl Succinic Anhydride | 2.9 | | | | | | |
| N-(Triethoxysilylpropyl)-O-Polyethyleneoxide Urethane | | 2.9 | | | | | |

| Ingredients | | | | | | | |
|---|---|---|---|---|---|---|---|
| Silane, trimethoxy[3-(oxiranyl methoxy)propyl] | | 2.9 | | | | | |
| 3-Ureidopropyl Triethoxysilane | | | 2.9 | 1.9 | 1.9 | 1.9 | |
| 2-(3,4 epoxycyclohexyl)-ethyltrimethoxysilane | | | | | 1 | | |
| 3-(Trimethoxysilyl)propyl Methacrylate | | | | | | 1 | |
| Hexamethyl Disiloxane | | | | | | | 1 |
| Total | 100.00 | 100.00 | 100.00 | 100.00 | 100.00 | 100.00 | 100.00 |

| | Examples | | | | | | |
|---|---|---|---|---|---|---|---|
| Ingredients | 155 | 156 | 157 | 158 | 159 | 160 | 161 |
| ST-O25 | 76 | 76 | 76 | 76 | 76 | 76 | 76 |
| Deionized water | 11.1 | 11.1 | 11.1 | 11.1 | 11.1 | 11.1 | 11.1 |
| Ethylene Glycol | 10 | 10 | 10 | 10 | 10 | 10 | 10 |
| 3-Ureidopropyl Triethoxysilane | 1.9 | 1.9 | 1.9 | 1.9 | 1.9 | 1.9 | 1.9 |
| Hexamethyl Disilazane | 1 | | | | | | |
| Trimethoxy Methyl Silane | | 1 | | | | | |
| Trimethoxy Phenyl Silane | | | 1 | | | | |
| Vinyl Trimethoxysilane | | | | 1 | | | |
| 3-(N,N-Dimethylaminopropyl)-Trimethoxysilane | | | | | 1 | | |
| 3-(Diethylamino)propyl trimethoxysilane | | | | | | 1 | |
| Trimethoxy(octadecyl)silane | | | | | | | 1 |
| Total | 100.00 | 100.00 | 100.00 | 100.00 | 100.00 | 100.00 | 100.00 |

| | Examples | | | | | | |
|---|---|---|---|---|---|---|---|
| Ingredients | 162 | 163 | 164 | 165 | 166 | 167 | 168 |
| ST-O25 | 76 | 76 | 76 | 76 | 76 | 76 | 76 |
| Deionized water | 11.1 | 11.1 | 11.1 | 11.1 | 11.1 | 11.1 | 11.1 |
| Ethylene Glycol | 10 | 10 | 10 | 10 | 10 | 10 | 10 |
| 3-Ureidopropyl Triethoxysilane | 1.9 | 1.9 | 1.9 | 1.9 | 1.9 | 1.9 | 1.9 |
| Isobutyl Trimethoxysilane | 1 | | | | | | |
| Hexyltrimethoxysilane | | 1 | | | | | |
| Decyltrimethoxysilane | | | 1 | | | | |
| Isooctyltrimethoxysilane | | | | 1 | | | |
| Hexadecyltrimethoxysilane | | | | | 1 | | |
| Propyltrimethoxysilane | | | | | | 1 | |
| Octyltriethoxysilane | | | | | | | 1 |
| Total | 100.00 | 100.00 | 100.00 | 100.00 | 100.00 | 100.00 | 100.00 |

| Description | Ingredients | Examples | | | | | | |
|---|---|---|---|---|---|---|---|---|
| | | 169 | 170 | 171 | 172 | 173 | 174 | 175 |
| Colloidal silica 25 wt % silica solids available from Nissan Chemical America | ST-O-25 | 52.68 | | 50 | | 51 | | 25 |
| Alkaline Colloidal Silica from Nissan Chemical Company, Japan | ST-32C | | 59.28 | | 48 | | 45 | 25 |
| | Deionized water | 36.05 | 27.97 | 40 | 41.5 | 38.5 | 43 | 35 |
| | Propylene Glycol | | | | 8 | 7.5 | 8.5 | |
| | Ethylene Glycol | 8.06 | 9.85 | 7.5 | | | | 10 |
| | Silane, trimethoxy[3-(oxiranyl methoxy)propyl] | 3.21 | 2.9 | 2.5 | 2.5 | 3 | 3.5 | 5 |
| | Total (g) | 100 | 100 | 100 | 100 | 100 | 100 | 100 |

In examples 7-168 it is expedient to make a Polysiloxane Oligomer Premix Preparation before surface functionalization of colloidal silica mixtures.

Polysiloxane Oligomer Premix Preparation:

Make pH 3 water from 100 g deionized water and 3-4 drops of 10% HCl while mixing and monitoring the pH using a calibrated pH meter. Continue until the pH of the mixture is measured to be 3.0 Add the organosilanes in the required proportions to form a mixture of organosilanes, then add pH 3 water to the organosilane combination and mix with magnetic stirrer/stir bar in a 100 mL polypropylene beaker.

The mixture will appear hazy at first, then it should change appearance and clarify to a visually clear, transparent solution. After the clear, transparent mixture is achieved, wait at least 30 minutes to allow for the oligomerization reaction to proceed to completion.

Wait 30 minutes with each mixture to allow for oligomerization reaction before using it to surface treat aqueous silica sols. After 30 min the organosilane oligomer mixture can be used to surface treat aqueous silicasols.

Polysiloxane oligomer preparations are observed for clarity, gelation/polymerization, or formation of agglomerations/white precipitate. Preparations resulting in clear liquids or clear slight viscous liquids are listed as "OK" and deemed usable. Those preparations showing gelation/polymerization agglomeration, or white precipitate formation are concluded to be unusable. It is believed that oligomer preparation without sufficient monomeric hydrophilic content are prone to failure in an aqueous or semi aqueous environment.

Surface Functionalization Method of Aqueous Silicasols

Standard Formula, use for all Silica Sols utilizing Polysiloxane Oligomer surface treatment

| | |
|---|---|
| Aqueous Silica Sol (ST-O25 or ST-32C) | 59.28 |
| Deionized water | 27.98 |
| Ethylene Glycol or Propylene Glycol | 9.85 |
| Silane Oligomer Premix | 2.9 |
| Total Parts | 100.01 |

Add aqueous silica sol ST-32 C or ST-O25, DI water, Ethylene Glycol or Propylene Glycol and a stir bar to a glass reactor and bring the silica sol to 50° C. A 10 mL addition funnel is fitted to the reactor and used to add the polysiloxane oligomer preparations dropwise while the reaction mixes until finished. Surface treatment is allowed to react with silica surfaces for a period of 2 hours at 50 C and allowed to cool.

Surface Functionalization Method of Aqueous Silicasols

Standard Formula use for all Silica Sols utilizing monomeric organosilanes surface treatment, such as examples 1-6 and examples 169-175.

| | |
|---|---|
| ST-32C or ST-O25 | 59.28 |
| Deionized water | 27.98 |
| Ethylene Glycol or Propylene Glycol | 9.85 |
| Monomeric Organosilane or mixture | 2.9 |
| Total Parts | 100.01 |

Add aqueous silica sol ST-32 C or ST-O25, DI water, Ethylene Glycol and a stir bar to a glass reactor and bring the silica sol to 50° C. If a mixture of organosilanes is used, these are prepared and mixed by hand before adding to an addition funnel. A 10 mL addition funnel is fitted to the reactor and used to add the monomeric organosilanes or mixture of monomeric organosilanes dropwise while the reaction mixes until finished. Surface treatment is allowed to react with silica surfaces for a period of 2 hours at 50 C and allowed to cool.

Brine resistant silica sols and hydrocarbon recovery fluids comprising surface functionalized nanoparticles, where the surface functionalized nanoparticles are brine resistant silica sols, can be found in U.S. patent application Ser. No. 15/946,252; filed Apr. 5, 2018, entitled "Brine Resistant Silica Sols"; U.S. patent application Ser. No. 15/946,338, filed Apr. 5, 2018, entitled "Hydrocarbon Formation Treatment Micellar Solutions"; U.S. patent application Ser. No. 16/129,688; filed: Sep. 12, 2018, entitled "Crude Oil Recovery Chemical Fluids", which application claims priority to Japanese Patent Application No. JP 2017-175511; and U.S. patent application Ser. No. 16/129,705; filed: Sep. 12, 2018, entitled "Crude Oil Recovery Chemical Fluid", which application claims priority to Japanese Patent Application No. JP 2017-175511; wherein all US Patent Applications are herein incorporated by reference, in their entirety.

When selecting/using a fluid to be used in combination with a proppant in the treatment of an oil and/or gas well, it is important for the fluid to have the right combination of additives and components to achieve the necessary characteristics of the specific end-use application. A primary goal amongst many aspects of hydrocarbon formation treatment is to optimize recovery of oil and/or gas from the formation. However, in part because the fluids utilized during the operation of an oil and/or gas well are often utilized to perform a number of tasks simultaneously, achieving necessary to optimal characteristics of the Hydrocarbon Recovery Fluid comprising surface functionalized nanoparticles is always challenging.

Additional commercially available compositions suitable for the Hydrocarbon Recovery Fluid include the nanoActiv® HRT product line available from Nissan Chemical America Corporation, located at 10333 Richmond Avenue, Suite 1100 Houston, Tex. 77042. These products, including developmental products that are currently being trialed, use nanosized particles in a colloidal dispersion, which allows the fluid to work by causing a Brownian-motion, diffusion-driven mechanism known as disjoining pressure to produce long efficacy in the recovery of hydrocarbons in conventional and unconventional reservoirs.

Current commercially available nanoActiv®HRT products, include, but are not limited to:
a. HRT BIO/G—am environmentally friendly version
b. OFS CORR PRO—a version containing a sour gas scavenger for reducing corrosion of iron piping due to $H_2S$
c. HRT-78—a version formulated for high temperatures
d. CPD-60—a version containing a hydroxysultaine surfactant
e. CPD-37—the original version that was first sold
f. HRT-53—economical, high performing commercial product
g. HRT-53 C—another version of HRT-53C with a more dilute composition Additional Hydrocarbon Recovery Fluids comprising functionalized colloidal silica mixtures suitable for this invention include a crude oil recovery chemical solution which is excellent in resistance to high temperature and salt, characterized by containing a silane compound, an aqueous silica sol having an average particle size of from about 3 nm to about 200 nm.

In an embodiment of the Hydrocarbon Recovery Fluid comprising surface functionalized nanoparticles, the aqueous silica sol contains silica particles in which at least a part of the silane compound is bonded on the surface of at least a part of the silica particles in the sol.

In another embodiment of the Hydrocarbon Recovery Fluid comprising surface functionalized nanoparticles, the silane compound is at least one compound selected from the group consisting of a silane coupling agent having at least one organic functional group selected from the group consisting of a vinyl group, an ether group, an epoxy group, a styryl group, a methacryl group, an acryl group, an amino group and an isocyanurate group, an alkoxysilane group, a silazane group and a siloxane group.

In another embodiment of the Hydrocarbon Recovery Fluid comprising surface functionalized nanoparticles, aqueous silica sol is present in an amount of from about 0.1% by mass to about 20% by mass, based on the total mass of the crude oil recovery chemical solution, in terms of silica solid content.

Preparation of Treatment Fluid to be Used with Proppant
First Step: Preparation of Aqueous Sol Synthesis Example 1

In a 500-ml glass eggplant flask, 200 g of an aqueous silica sol (SNOWTEX (registered trademark) ST-O manufactured by Nissan Chemical Corporation, silica concentration=20.5% by mass, the average particle diameter of 11.0 nm according to the BET method, DLS average particle diameter of 17.2 nm) and a magnetic stir bar were put. After that, with stirring with a magnetic stirrer, 4.0 g of 3-glycidoxypropyltrimethoxysilane (Dynasylan GLYMO manufactured by Evonik Industries AG) was charged such that the mass ratio of the silane compound to silica in the aqueous silica sol was 0.09. Subsequently, a cooling tube through which tap water flowed was installed above the eggplant flask. Under reflux, the temperature of the aqueous sol was increased to 60° C. and held at 60° C. for 3 hours, and thereafter cooled. After cooling to room temperature, the aqueous sol was taken out.

We obtained 204 g of an aqueous sol including an aqueous silica sol surface-treated with a silane compound in which the mass ratio of the silane compound was 0.09 with respect to silica in the aqueous silica sol, the silica solid content=20.2% by mass, pH=3.1, electrical conductivity=452 μS/cm, and DLS average particle diameter=24.3 nm.

Synthesis Example 2

An aqueous sol was obtained through the same operation as in Synthesis Example 1 except that 7.9 g of 3-glycidoxypropyltrimethoxysilane (Dynasylan GLYMO manufactured by Evonik Industries AG) was charged such that the mass ratio of the silane compound was 0.20 with respect to silica in the aqueous silica sol (SNOWTEX® ST-O manufactured by Nissan Chemical Corporation, silica concentration=20.5% by mass, average particle diameter of 11.0 nm according to the BET method, DLS average particle diameter of 17.2 nm).

We obtained 208 g of an aqueous sol including an aqueous silica sol surface-treated with a silane compound in which the mass ratio of the silane compound was 0.2 with respect to silica in the aqueous silica sol, silica solid content=20.6% by mass, pH=2.9, electrical conductivity=544 μS/cm, and DLS average particle diameter=19.5 nm.

Synthesis Example 3

An aqueous sol was obtained through the same operation as in Synthesis Example 1 except that 15.8 g of 3-glycidoxypropyltrimethoxysilane (Dynasylan GLYMO manufactured by Evonik Industries AG) was charged such that the mass ratio of the silane compound was 0.40 with respect to silica in the aqueous silica sol (SNOWTEX® ST-O manufactured by Nissan Chemical Corporation, silica concentration=20.5% by mass, average particle diameter of 11.0 nm according to the BET method, DLS average particle diameter of 17.2 nm).

We obtained 216 g of an aqueous sol including an aqueous silica sol surface-treated with a silane compound in which the mass ratio of the silane compound was 0.4 with respect to silica in the aqueous silica sol, silica solid content=20.5% by mass, pH=2.9, electrical conductivity=474 μS/cm, and DLS average particle diameter=19.7 nm.

Synthesis Example 4

An aqueous sol was obtained through the same operation as in Synthesis Example 1 except that 31.6 g of 3-glycidoxypropyltrimethoxysilane (Dynasylan GLYMO manufactured by Evonik Industries AG) was charged such that the mass ratio of the silane compound was 0.80 with respect to silica in the aqueous silica sol (SNOWTEX® ST-O manufactured by Nissan Chemical Corporation, silica concentration=20.5% by mass, average particle diameter of 11.0 nm according to the BET method, DLS average particle diameter of 17.2 nm).

We obtained 231 g of an aqueous silica sol surface-treated with a silane compound in which the mass ratio of the silane compound was 0.8 with respect to silica in the aqueous silica sol, silica solid content=20.6% by mass, pH=2.8, electrical conductivity=413 μS/cm, and DLS average particle diameter=20.8 nm.

Synthesis Example 5

In a 500-ml glass eggplant flask, 250 g of an aqueous silica sol (SNOWTEX® ST-OXS manufactured by Nissan Chemical Corporation, silica concentration=10.4% by mass, the average particle diameter of 5.0 nm according to Sears method, DLS average particle diameter of 8.1 nm) and a magnetic stir bar were put. After that, with stirring with a magnetic stirrer, 88.9 g of 3-glycidoxypropyltrimethoxysilane (Dynasylan GLYMO manufactured by Evonik Industries AG) was charged such that the mass ratio of the silane compound to silica in the aqueous silica sol was 3.4. Subsequently, a cooling tube through which tap water flowed was installed above the eggplant flask. Under reflux, the temperature of the aqueous sol was increased to 60° C. and held at 60° C. for 3 hours, and thereafter cooled. After cooling to room temperature, the aqueous sol was taken out.

We obtained 338 g of an aqueous sol including an aqueous silica sol surface-treated with a silane compound in which the mass ratio of the silane compound was 3.4 with respect to silica in the aqueous silica sol, the silica solid content=14.3% by mass, pH=2.9, electrical conductivity=163 μS/cm, and DLS average particle diameter=8.1 nm.

Synthesis Example 6

An aqueous sol was obtained through the same operation as in Synthesis Example 1 except that in a 500-ml glass eggplant flask, 200 g of an aqueous silica sol (SNOWTEX® ST-OL manufactured by Nissan Chemical Corporation, silica concentration=20.0% by mass, the average particle diameter of 46 nm according to the BET method, DLS average particle diameter of 75.8 nm) and a magnetic stir bar were put, and then, with stirring with a magnetic stirrer, 31.9 g of 3-glycidoxypropyltrimethoxysilane (Dynasylan GLYMO manufactured by Evonik Industries AG) was charged such that the mass ratio of the silane compound was 1.6 with respect to silica in the aqueous silica sol.

We obtained 231 g of an aqueous silica sol surface-treated with a silane compound in which the mass ratio of the silane compound was 0.8 with respect to silica in the aqueous silica sol, silica solid content=21.2% by mass, pH=3.1, electrical conductivity=160 µS/cm, and DLS average particle diameter=76.4 nm.

Synthesis Example 7

An aqueous sol was obtained through the same operation as in Synthesis Example 1 except that in a 500-ml glass eggplant flask, 115 g of an aqueous silica sol (SNOWTEX® ST-OZL-35 manufactured by Nissan Chemical Corporation, silica concentration=35.7% by mass, the average particle diameter of 83 nm according to the BET method, DLS average particle diameter of 126 nm), 85 g of pure water and a magnetic stir bar were put, and then, with stirring with a magnetic stirrer, 32.8 g of 3-glycidoxypropyltrimethoxysilane (Dynasylan GLYMO manufactured by Evonik Industries AG) was charged such that the mass ratio of the silane compound was 0.8 with respect to silica in the aqueous silica sol.

We obtained 232 g of an aqueous silica sol surface-treated with a silane compound in which the mass ratio of the silane compound was 1.6 with respect to silica in the aqueous silica sol, silica solid content=20.7% by mass, pH=2.6, electrical conductivity=579 µS/cm, and DLS average particle diameter=119 nm.

Preparation of Treatment Fluid for Use with Proppant

Example 1

In a 300-ml styrene container, a stir bar was put, and 91.0 g of pure water was charged. With stirring with a magnetic stirrer, 2.3 g of an anionic surfactant sodium α-olefin sulfonate (NEOGEN® AO-90 manufactured by DKS Co. Ltd.) was charged and stirred until it was completely melted. Subsequently, 4.7 g of an anionic surfactant sodium dodecyl sulfate (Shinorine® 90TK-T manufactured by New Japan Chemical CO., Ltd.) was charged and stirred until it was completely melted.

Subsequently, 22.0 g of the aqueous silica sol produced in Synthesis Example 2 was charged. Subsequently, 30.0 g of polyoxyethylene nonylphenyl ether (reagent Tergitol® NP-9 manufactured by Sigma-Aldrich Corporation) with HLB=13.0 was charged as a nonionic surfactant and then stirred for 1 hour to produce a chemical fluid of Example 1.

A brine test sample (a) was prepared according to the high temperature and salt resistance evaluation-1 and held at 100° C. for 30 hours. After that, the sample was taken out to evaluate the resistance to high temperature and salt.

Example 2

A chemical fluid of Example 2 was produced through the same operation as in Example 1 except that the amount of pure water charged was 106.0 g and the amount of polyoxyethylene nonylphenyl ether (regent Tergitol® NP-9 manufactured by Sigma-Aldrich Corporation) with HLB=13.0 charged as a nonionic surfactant was 15.0 g.

A brine test sample (a) was prepared according to the high temperature and salt resistance evaluation-1 and held at 100° C. for 30 hours. After that, the sample was taken out to evaluate the resistance to high temperature and salt.

Example 3

A chemical fluid of Example 3 was produced through the same operation as in Example 1 except that the amount of pure water charged was 113.5 g and the amount of polyoxyethylene nonylphenyl ether with HLB=13.0 (reagent Tergitol® NP-9 manufactured by Sigma-Aldrich Corporation) charged as a nonionic surfactant was 7.5 g.

A brine test sample (a) was prepared according to the high temperature and salt resistance evaluation-1 and held at 100° C. for 30 hours. After that, the sample was taken out to evaluate the resistance to high temperature and salt.

Example 4

A chemical fluid of Example 4 was produced through the same operation as in Example 2 except that polyoxyethylene styrenated phenyl ether (NOIGEN® EA-137 manufactured by DKS Co. Ltd.) with HLB=13.0 was employed as a nonionic surfactant and charged in an amount of 15.0 g.

A brine test sample (a) was prepared according to the high temperature and salt resistance evaluation-1 and held at 100° C. for 30 hours. After that, the sample was taken out to evaluate the resistance to high temperature and salt.

Example 5

A chemical fluid of Example 5 was produced through the same operation as in Example 2 except that the amount of pure water charged was 99.6 g, and 21.4 g of a product of polyoxyethylene styrenated phenyl ether (NOIGEN® EA-157 manufactured by DKS Co. Ltd.) with HLB=14.3 diluted with pure water to contain 70% of active ingredients was charged as a nonionic surfactant.

A brine test sample (a) was prepared according to the high temperature and salt resistance evaluation-1 and held at 100° C. for 30 hours. After that, the sample was taken out to evaluate the resistance to high temperature and salt.

Example 6

In a 300-ml styrene container, a stir bar was put, and 99.5 g of pure water was charged. With stirring with a magnetic stirrer, 1.8 g of an anionic surfactant sodium α-olefin sulfonate (NEOGEN® AO-90 manufactured by DKS Co. Ltd.) was charged and stirred until it was completely melted. Subsequently, 5.3 g of an anionic surfactant sodium dodecyl sulfate (Shinorine® 90TK-T manufactured by New Japan Chemical CO., Ltd.) was charged and stirred until it was completely melted.

Subsequently, 22.0 g of the aqueous silica sol produced in Synthesis Example 2 was charged. Subsequently, 21.4 g of a product of polyoxyethylene styrenated phenyl ether (NOIGEN® EA-157 manufactured by DKS Co. Ltd.) with HLB=14.3 diluted with pure water to contain 70% of active ingredients was charged as a nonionic surfactant and then stirred for 1 hour to produce a chemical fluid of Example 6.

A brine test sample (a) was prepared according to the high temperature and salt resistance evaluation-1 and held at 100° C. for 60 hours. After that, the sample was taken out to evaluate the resistance to high temperature and salt.

Example 7

In a 300-ml styrene container, a stir bar was put, and 99.6 g of pure water was charged. With stirring with a magnetic stirrer, 3.5 g of an anionic surfactant sodium α-olefin sulfonate (NEOGEN® AO-90 manufactured by DKS Co. Ltd.) was charged and stirred until it was completely melted. Subsequently, 3.5 g of an anionic surfactant sodium dodecyl sulfate (Shinorine® 90TK-T manufactured by New Japan Chemical CO., Ltd.) was charged and stirred until it was completely melted.

Subsequently, 22.0 g of the aqueous silica sol produced in Synthesis Example 3 was charged. Subsequently, 21.4 g of a product of polyoxyethylene styrenated phenyl ether (NOIGEN® EA-157 manufactured by DKS Co. Ltd.) with HLB=14.3 diluted with pure water to contain 70% of active ingredients was charged as a nonionic surfactant and then stirred for 1 hour to produce a chemical fluid of Example 7.

A brine test sample (a) was prepared according to the high temperature and salt resistance evaluation-1 and held at 100° C. for 60 hours. After that, the sample was taken out to evaluate the resistance to high temperature and salt.

Example 8

In a 300-ml styrene container, a stir bar was put, and 99.6 g of pure water was charged. With stirring with a magnetic stirrer, 3.5 g of an anionic surfactant sodium α-olefin sulfonate (NEOGEN® AO-90 manufactured by DKS Co. Ltd.) was charged and stirred until it was completely melted. Subsequently, 3.5 g of an anionic surfactant sodium dodecyl sulfate (Shinorine® 90TK-T manufactured by New Japan Chemical CO., Ltd.) was charged and stirred until it was completely melted.

Subsequently, 22.0 g of the aqueous silica sol produced in Synthesis Example 3 was charged. Subsequently, 21.4 g of a product of polyoxyethylene styrenated phenyl ether (NOIGEN® EA-157 manufactured by DKS Co. Ltd.) with HLB=14.3 diluted with pure water to contain 70% of active ingredients was charged as a nonionic surfactant and then stirred for 1 hour to produce a chemical fluid of Example 8.

A brine test sample (b) was prepared according to the high temperature and salt resistance evaluation-2 and held at 100° C. for 60 hours. After that, the sample was taken out to evaluate the resistance to high temperature and salt.

Example 9

In a 300-ml styrene container, a stir bar was put, and 99.6 g of pure water was charged. With stirring with a magnetic stirrer, 3.5 g of an anionic surfactant sodium α-olefin sulfonate (NEOGEN® AO-90 manufactured by DKS Co. Ltd.) was charged and stirred until it was completely melted. Subsequently, 3.5 g of an anionic surfactant sodium dodecyl sulfate (Shinorine® 90TK-T manufactured by New Japan Chemical CO., Ltd.) was charged and stirred until it was completely melted.

Subsequently, 22.0 g of the aqueous silica sol surface-treated with the silane compound produced in Synthesis Example 4 was charged. Subsequently, 21.4 g of a product of polyoxyethylene styrenated phenyl ether (manufactured by DKS Co. Ltd. NOIGEN® EA-157) with HLB=14.3 diluted with pure water to contain 70% of active ingredients was charged as a nonionic surfactant and then stirred for 1 hour to produce a chemical fluid of Example 9.

A seawater test sample was prepared according to the high temperature and salt resistance evaluation-3 and held at 100° C. for 60 hours. After that, the sample was taken out to evaluate the resistance to high temperature and salt.

Example 10

In a 300-ml styrene container, a stir bar was put, and 99.6 g of pure water was charged. With stirring with a magnetic stirrer, 3.5 g of an anionic surfactant sodium α-olefin sulfonate (NEOGEN® AO-90 manufactured by DKS Co. Ltd.) was charged and stirred until it was completely melted. Subsequently, 3.5 g of an anionic surfactant sodium dodecyl sulfate (Shinorine® 90TK-T manufactured by New Japan Chemical CO., Ltd.) was charged and stirred until it was completely melted.

Subsequently, 22.0 g of the aqueous silica sol surface-treated with the silane compound produced in Synthesis Example 3 was charged. Subsequently, 15.2 g of polyoxyethylene tridecyl ether (NOIGEN® TDS-90 manufactured by DKS Co. Ltd.) with HLB=13.6 was charged as a nonionic surfactant and then stirred for 1 hour to produce a chemical fluid of Example 10.

A brine test sample (a) was prepared according to the high temperature and salt resistance evaluation-1 and held at 100° C. for 30 hours. After that, the sample was taken out to evaluate the resistance to high temperature and salt.

Example 11

In a 300-ml styrene container, a stir bar was put, and 99.6 g of pure water was charged. With stirring with a magnetic stirrer, 3.5 g of an anionic surfactant sodium α-olefin sulfonate (NEOGEN® AO-90 manufactured by DKS Co. Ltd.) was charged and stirred until it was completely melted. Subsequently, 3.5 g of an anionic surfactant sodium dodecyl sulfate (Shinorine® 90TK-T manufactured by New Japan Chemical CO., Ltd.) was charged and stirred until it was completely melted.

Subsequently, 22.0 g of the aqueous silica sol surface-treated with the silane compound produced in Synthesis Example 4 was charged. Subsequently, 21.4 g of a product of polyoxyethylene styrenated phenyl ether (manufactured by DKS Co. Ltd. NOIGEN® EA-157) with HLB=14.3 diluted with pure water to contain 70% of active ingredients was charged as a nonionic surfactant and then stirred for 1 hour to produce a chemical fluid of Example 11.

A brine test sample (b) was prepared according to the high temperature and salt resistance evaluation-2 and held at 100° C. for 60 hours. After that, the sample was taken out to evaluate the resistance to high temperature and salt.

Example 12

In a 300-ml styrene container, a stir bar was put, and 48.8 g of pure water was charged. With stirring with a magnetic stirrer, 3.5 g of an anionic surfactant sodium α-olefin sulfonate (NEOGEN® AO-90 manufactured by DKS Co. Ltd.) was charged and stirred until it was completely melted. Subsequently, 3.5 g of an anionic surfactant sodium dodecyl sulfate (Shinorine® 90TK-T manufactured by New Japan Chemical CO., Ltd.) was charged and stirred until it was completely melted.

Subsequently, 72.8 g of the aqueous silica sol surface-treated with the silane compound produced in Synthesis Example 4 was charged. Subsequently, 21.4 g of a product of polyoxyethylene styrenated phenyl ether (manufactured by DKS Co. Ltd. NOIGEN® EA-157) with HLB=14.3 diluted with pure water to contain 70% of active ingredients was charged as a nonionic surfactant and then stirred for 1 hour to produce a chemical fluid of Example 12.

A seawater test sample was prepared according to the high temperature and salt resistance evaluation-3 and held at 100° C. for 60 hours. After that, the sample was taken out to evaluate the resistance to high temperature and salt.

Example 13

In a 300-ml styrene container, a stir bar was put and 6.4 g of pure water and 131.1 g of the aqueous silica sol surface-treated with the silane compound produced in Synthesis Example 4 were charged and stirred with a magnetic stirrer. With stirring with a magnetic stirrer, 3.5 g of an anionic surfactant sodium α-olefin sulfonate (LIPOLAN® LB-440 manufactured by Lion Specialty Chemicals Co. Ltd., active ingredients: 36.3%) was charged and stirred. Subsequently, 1.3 g of an anionic surfactant sodium dodecyl sulfate (Shinorine® 90TK-T manufactured by New Japan Chemical CO., Ltd.) was charged and stirred until it was completely melted. Then, 7.7 g of a product of polyoxyethylene styrenated phenyl ether (manufactured by DKS Co. Ltd. NOIGEN® EA-157) with HLB=14.3 diluted with pure water to contain 70% of active ingredients was charged as a nonionic surfactant and then stirred for 1 hour to produce a chemical fluid of Example 13.

A seawater test sample was prepared according to the high temperature and salt resistance evaluation-3 and held at 100° C. for 60 hours. After that, the sample was taken out to evaluate the resistance to high temperature and salt.

Example 14

In a 300-ml styrene container, a stir bar was put and 14.7 g of pure water and 131.1 g of the aqueous silica sol surface-treated with the silane compound produced in Synthesis Example 4 were charged and stirred with a magnetic stirrer. With stirring with a magnetic stirrer, 1.2 g of an anionic surfactant sodium α-olefin sulfonate (LIPOLAN® LB-440 manufactured by Lion Specialty Chemicals Co. Ltd., active ingredients: 36.3%) was charged and stirred. Subsequently, 0.45 g of an anionic surfactant sodium dodecyl sulfate (Shinorine® 90TK-T manufactured by New Japan Chemical CO., Ltd.) was charged and stirred until it was completely melted. Then, 2.6 g of a product of polyoxyethylene styrenated phenyl ether (manufactured by DKS Co. Ltd. NOIGEN® EA-157) with HLB=14.3 diluted with pure water to contain 70% of active ingredients was charged as a nonionic surfactant and then stirred for 1 hour to produce a chemical fluid of Example 14.

A seawater test sample was prepared according to the high temperature and salt resistance evaluation-3 and held at 100° C. for 60 hours. After that, the sample was taken out to evaluate the resistance to high temperature and salt.

Example 15

In a 300-ml styrene container, a stir bar was put and 15.5 g of pure water and 131.1 g of the aqueous silica sol surface-treated with the silane compound produced in Synthesis Example 4 were charged and stirred with a magnetic stirrer. With stirring with a magnetic stirrer, 1.2 g of an anionic surfactant sodium α-olefin sulfonate (LIPOLAN® LB-440 manufactured by Lion Specialty Chemicals Co. Ltd., active ingredients: 36.3%) was charged and stirred. Subsequently, 0.45 g of an anionic surfactant sodium dodecyl sulfate (Shinorine® 90TK-T manufactured by New Japan Chemical CO., Ltd.) was charged and stirred until it was completely melted. Then, 1.8 g of polyoxyethylene styrenated phenyl ether (manufactured by DKS Co. Ltd. NOIGEN® EA-127) with HLB=11.7 was charged as a nonionic surfactant and then stirred for 1 hour to produce a chemical fluid of Example 15.

A seawater test sample was prepared according to the high temperature and salt resistance evaluation-3 and held at 100° C. for 60 hours. After that, the sample was taken out to evaluate the resistance to high temperature and salt.

Example 16

In a 300-ml styrene container, a stir bar was put and 14.0 g of pure water and 131.1 g of the aqueous silica sol surface-treated with the silane compound produced in Synthesis Example 4 were charged and stirred with a magnetic stirrer. With stirring with a magnetic stirrer, 1.2 g of an anionic surfactant sodium α-olefin sulfonate (LIPOLAN® LB-440 manufactured by Lion Specialty Chemicals Co. Ltd., active ingredients: 36.3%) was charged and stirred. Subsequently, 0.45 g of an anionic surfactant sodium dodecyl sulfate (Shinorine® 90TK-T manufactured by New Japan Chemical CO., Ltd.) was charged and stirred until it was completely melted. Then, 3.3 g of polyoxyethylene styrenated phenyl ether (manufactured by DKS Co. Ltd. NOIGEN® EA-207D, active ingredients: 55%) with HLB=18.7 was charged as a nonionic surfactant and then stirred for 1 hour to produce a chemical fluid of Example 16.

A seawater test sample was prepared according to the high temperature and salt resistance evaluation-3 and held at 100° C. for 60 hours. After that, the sample was taken out to evaluate the resistance to high temperature and salt.

Example 17

In a 300-ml styrene container, a stir bar was put, and 90.1 g of pure water was charged. With stirring with a magnetic stirrer, 3.5 g of an anionic surfactant sodium α-olefin sulfonate (NEOGEN® AO-90 manufactured by DKS Co. Ltd.) was charged and stirred until it was completely melted. Subsequently, 3.5 g of an anionic surfactant sodium dodecyl sulfate (Shinorine® 90TK-T manufactured by New Japan Chemical CO., Ltd.) was charged and stirred until it was completely melted.

Subsequently, 31.5 g of the aqueous silica sol produced in Synthesis Example 5 was charged. Subsequently, 21.4 g of polyoxyethylene styrenated phenyl ether (manufactured by DKS Co. Ltd. NOIGEN® EA-157) with HLB=14.3 was charged as a nonionic surfactant and then stirred for 1 hour to produce a chemical fluid of Example 17.

A brine test sample (a) was prepared according to the high temperature and salt resistance evaluation-1 and held at 100° C. for 60 hours. After that, the sample was taken out to evaluate the resistance to high temperature and salt.

Example 18

In a 300-ml styrene container, a stir bar was put and 18.4 g of pure water and 127.4 g of the aqueous silica sol surface-treated with the silane compound produced in Synthesis Example 6 were charged and stirred with a magnetic stirrer. With stirring with a magnetic stirrer, 1.2 g of an anionic surfactant sodium α-olefin sulfonate (LIPOLAN® LB-440 manufactured by Lion Specialty Chemicals Co. Ltd., active ingredients: 36.3%) was charged and stirred. Subsequently, 0.45 g of an anionic surfactant sodium dodecyl sulfate (Shinorine® 90TK-T manufactured by New Japan Chemical CO., Ltd.) was charged and stirred until it was completely melted. Then, 2.6 g of a product of polyoxyethylene styrenated phenyl ether (manufactured by DKS Co. Ltd. NOIGEN® EA-157) with HLB=14.3 diluted with pure water to contain 70% of active ingredients was charged as a nonionic surfactant and then stirred for 1 hour to produce a chemical fluid of Example 18.

A seawater test sample was prepared according to the high temperature and salt resistance evaluation-3 and held at 100° C. for 30 hours. After that, the sample was taken out to evaluate the resistance to high temperature and salt.

Example 19

In a 300-ml styrene container, a stir bar was put and 15.3 g of pure water and 130.5 g of the aqueous silica sol surface-treated with the silane compound produced in Synthesis Example 7 were charged and stirred with a magnetic stirrer. With stirring with a magnetic stirrer, 1.2 g of an anionic surfactant sodium α-olefin sulfonate (LIPOLAN® LB-440 manufactured by Lion Specialty Chemicals Co. Ltd., active ingredients: 36.3%) was charged and stirred. Subsequently, 0.4 g of an anionic surfactant sodium dodecyl sulfate (Shinorine® 90TK-T manufactured by New Japan Chemical CO., Ltd.) was charged and stirred until it was completely melted. Then, 2.6 g of a product of polyoxyethylene styrenated phenyl ether (manufactured by DKS Co. Ltd. NOIGEN® EA-157) with HLB=14.3 diluted with pure water to contain 70% of active ingredients was charged as a nonionic surfactant and then stirred for 1 hour to produce a chemical fluid of Example 19.

A seawater test sample was prepared according to the high temperature and salt resistance evaluation-3 and held at 100° C. for 30 hours. After that, the sample was taken out to evaluate the resistance to high temperature and salt.

Example 20

A chemical fluid of Example 20 was produced through the similar operation as in Example 13.

A seawater test sample was prepared according to the high temperature and salt resistance evaluation-4 and held at 100° C. for 75 days (1800 hours). After that, the sample was taken out to evaluate the resistance to high temperature and salt.

Example 21

A chemical fluid of Example 21 was produced through the similar operation as in Example 14.

A seawater test sample was prepared according to the high temperature and salt resistance evaluation-4 and held at 100° C. for 75 days (1800 hours). After that, the sample was taken out to evaluate the resistance to high temperature and salt.

Reference Example 1

A chemical fluid of Reference Example 1 (comprising no silane compound) was produced through the same operation as in Example 1 except that 22.0 g of an aqueous silica sol (SNOWTEX® ST-O manufactured by Nissan Chemical Corporation) was charged instead of the aqueous silica sol produced in Synthesis Example 2.

A brine test sample (a) was prepared according to the high temperature and salt resistance evaluation-1 and held at room temperature for 7 days. After that, the sample was taken out to evaluate the salt resistance.

Reference Example 2

A chemical fluid of Reference Example 2 (mass ratio of silane compound to silica: 0.09) was produced through the same operation as in Example 1 except that 22.0 g of the aqueous silica sol produced in Synthesis Example 1 was charged instead of the aqueous silica sol produced in Synthesis Example 2.

A brine test sample (a) was prepared according to the high temperature and salt resistance evaluation-1 and held at room temperature for 7 days. After that, the sample was taken out to evaluate the salt resistance.

Reference Example 3

A chemical fluid of Reference Example 3 (comprising no nonionic surfactant) was produced through the same operation as in Example 1 except that the amount of polyoxyethylene nonylphenyl ether (reagent Tergitol® NP-9 manufactured by Sigma-Aldrich Corporation) with HLB=13.0 charged as a nonionic surfactant was 0 g.

A brine test sample (a) was prepared according to the high temperature and salt resistance evaluation-1, but it became cloudy immediately after preparation, and white gel was precipitated.

Reference Example 4

A chemical fluid of Reference Example 4 (comprising nonionic surfactant having a low HLB value) was produced through the same operation as in Example 4 except that the amount of polyoxyethylene styrenated phenyl ether (manufactured by DKS Co. Ltd. NOIGEN® EA-017) with HLB=2.7 charged as a nonionic surfactant was 15.0 g.

The chemical fluid prepared as above caused complete two-phase separation of an aqueous phase composed of the aqueous silica sol and the water-soluble anionic surfactant and an oil phase composed of the nonionic surfactant. Therefore, the evaluation of resistance to high temperature and salt could not be carried out.

Comparative Example 1

In a 300-ml styrene container, a stir bar was put, and 99.6 g of pure water was charged. With stirring with a magnetic stirrer, 6.8 g of an anionic surfactant sodium α-olefin sulfonate (NEOGEN® AO-90 manufactured by DKS Co. Ltd.) was charged and stirred until it was completely melted.

Subsequently, 22.0 g of the aqueous silica sol produced in Synthesis Example 3 was charged. Subsequently, 21.4 g of a product of polyoxyethylene styrenated phenyl ether (NOIGEN® EA-157 manufactured by DKS Co. Ltd.) with HLB=14.3 diluted with pure water to contain 70% of active ingredients was charged as a nonionic surfactant and then stirred for 1 hour to produce a chemical fluid of Comparative Example 1 (comprising only one anionic surfactant).

A brine test sample (b) was prepared according to the high temperature and salt resistance evaluation-2 and held at 100° C. for 60 hours. After that, the sample was taken out to evaluate the resistance to high temperature and salt.

Comparative Example 2

In a 300-ml styrene container, a stir bar was put, and 99.6 g of pure water was charged. With stirring with a magnetic stirrer, 6.8 g of an anionic surfactant sodium dodecyl sulfate (Shinorine® 90TK-T manufactured by New Japan Chemical CO., Ltd.) was charged and stirred until it was completely melted.

Subsequently, 22.0 g of the aqueous silica sol produced in Synthesis Example 3 was charged. Subsequently, 21.4 g of a product of polyoxyethylene styrenated phenyl ether (NOI- GEN® EA-157 manufactured by DKS Co. Ltd.) with HLB=14.3 diluted with pure water to contain 70% of active ingredients was charged as a nonionic surfactant and then stirred for 1 hour to produce a chemical fluid of Comparative Example 2 (comprising only one anionic surfactant).

A brine test sample (b) was prepared according to the high temperature and salt resistance evaluation-2 and held at 100° C. for 60 hours. After that, the sample was taken out to evaluate the resistance to high temperature and salt.

Comparative Example 3

In a 300-ml styrene container, a stir bar was put, and 128.0 g of pure water was charged. With stirring with a magnetic stirrer, 22.0 g of the aqueous silica sol produced in Synthesis Example 4 was charged and stirred until it to produce a chemical fluid of Comparative Example 3 (comprising only silane/silica and comprising no surfactant).

A brine test sample (b) was prepared according to the high temperature and salt resistance evaluation-2 and held at 100° C. for 60 hours. After that, the sample was taken out to evaluate the resistance to high temperature and salt.

Comparative Example 4

In a 300-ml styrene container, a stir bar was put, and 121.6 g of pure water was charged. With stirring with a magnetic stirrer, 3.5 g of an anionic surfactant sodium α-olefin sulfonate (NEOGEN® AO-90 manufactured by DKS Co. Ltd.) was charged and stirred until it was completely melted. Subsequently, 3.5 g of an anionic surfactant sodium dodecyl sulfate (Shinorine® 90TK-T manufactured by New Japan Chemical CO., Ltd.) was charged and stirred until it was completely melted. Then, 21.4 g of a product of polyoxyethylene styrenated phenyl ether (NOIGEN® EA-157 manufactured by DKS Co. Ltd.) with HLB=14.3 diluted with pure water to contain 70% of active ingredients was charged as a nonionic surfactant and then stirred for 1 hour to produce a chemical fluid of Comparative Example 4 (comprising only surfactant and comprising no silica/silane).

Choice of Proppant

In an embodiment, the proppant is sand. This is the cheapest, most abundant, and most used. The common forms of proppant sand are 20 mesh, 40 mesh, 70 mesh, 100 mesh, and combinations of these such as the common combinations 100/40 mesh, 70/40 mesh, and 40/20 mesh. There are many commercially available sources of sand suitable for use as a proppant.

Coating Method of Proppant 4 kg of commercially available proppant sand of 70/40 mesh size was placed into a 4 L Nalgene container and covered with treatment fluid comprising colloidal silica particles. The container was then sealed, and the sand/fluid mixture was mixed by shaking allowed to stand at room temperature for 12 hours to effect nanoparticle deposition onto proppant sand surfaces. The mixture was then poured into a 12"×24" glass baking dish and placed in a 100 C oven for a period of 24 hours until the mixture was dried. Samples of coated proppant sand and uncoated proppant sand were submitted to a $3^{rd}$ party laboratory for conductivity testing.

What is claimed:

1. A method of increasing production from a hydrocarbon containing formation by adding a proppant to the formation, characterized in that a treatment fluid comprising colloidal silica nanoparticles is added to the formation before, during or after the time the proppant is added to the formation, wherein the treatment fluid comprising the colloidal silica nanoparticles is a crude oil recovery chemical solution comprising a silane compound and an aqueous silica sol having an average particle size of from about 3 nm to about 200 nm, wherein the aqueous silica sol comprises silica particles in which at least a part of the silane compound is bonded on the surface of at least a part of the silica particles in the sol, and wherein the silane compound comprises 3-glycidoxypropyltrimethoxysilane.

2. The method of claim 1 characterized in that the treatment fluid comprising the colloidal silica nanoparticles is added to the formation before the time the proppant is added to the formation.

3. The method of claim 1 characterized in that the treatment fluid comprising the colloidal silica nanoparticles is added to the formation during the time the proppant is added to the formation.

4. The method of claim 1 characterized in that the treatment fluid comprising the colloidal silica nanoparticles is added to the formation after the time the proppant is added to the formation.

5. The method of claim 1 characterized in that the treatment fluid comprising the colloidal silica nanoparticles is added to the formation before and during the time the proppant is added to the formation.

6. The method of claim 1 characterized in that the treatment fluid comprising the colloidal silica nanoparticles is added to the formation during and after the time the proppant is added to the formation.

7. The method of claim 1 characterized in that the treatment fluid comprising the colloidal silica nanoparticles is added to the formation before and after the time the proppant is added to the formation.

8. The method of claim 1, wherein the aqueous silica sol is present in an amount of from about 0.1% by mass to about 20% by mass, based on the total mass of the crude oil recovery chemical solution, in terms of silica solid content.

9. The method of claim 1, wherein the proppant is sand.

10. The method of claim 9, wherein the sand is 20 mesh, 40 mesh, 70 mesh, or 100 mesh.

11. The method of claim 9, wherein the sand is a combination of 100 mesh and 40 mesh, a combination of 70 mesh and 40 mesh, or a combination of 40 mesh and 20 mesh.

12. The method of claim 1, wherein the proppant is coated with the treatment fluid comprising the colloidal silica nanoparticles.

13. The method of claim 1, wherein the silane compound further comprises an organosilane selected from 3-(triethoxysilyl)propyl succinic anhydride, 3-(trimethoxysilyl)propyl methacrylate, hexamethyl disiloxane, hexamethyl disilazane, trimethoxy methyl silane, trimethoxy phenyl silane, vinyl trimethoxysilane, 3-(N,N-dimethylaminopropyl)-trimethoxysilane, 3-(diethylamino)propyl trimethoxysilane, trimethoxy(octadecyl)silane, isobutyl trimethoxysilane, hexyltrimethoxysilane, decyltrimethoxysilane, isooctyltrimethoxysilane, hexadecyltrimethoxysilane, propyltrimethoxysilane, and octyltriethoxysilane.

14. The method of claim 1, wherein the silane compound comprises a polysiloxane oligomer formed from the 3-glycidoxypropyltrimethoxysilane and an organosilane selected from 3-(triethoxysilyl)propyl succinic anhydride, 3-(trimethoxysilyl)propyl methacrylate, hexamethyl disiloxane, hexamethyl disilazane, trimethoxy methyl silane, trimethoxy phenyl silane, vinyl trimethoxysilane, 3-(N,N-dimethylaminopropyl)-trimethoxysilane, 3-(diethylamino) propyl trimethoxysilane, trimethoxy(octadecyl)silane, isobutyl trimethoxysilane, hexyltrimethoxysilane, decyltrimethoxysilane, isooctyltrimethoxysilane, hexadecyltrimethoxysilane, propyltrimethoxysilane, and octyltriethoxysilane.

* * * * *